US007764741B2

(12) United States Patent
Moorti et al.

(10) Patent No.: US 7,764,741 B2
(45) Date of Patent: *Jul. 27, 2010

(54) MODULATION-TYPE DISCRIMINATION IN A WIRELESS COMMUNICATION NETWORK

(75) Inventors: Rajendra Tushar Moorti, Mountain View, CA (US); Min Chuin Hoo, Mountain View, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 11/695,795

(22) Filed: Apr. 3, 2007

(65) Prior Publication Data
US 2007/0183541 A1    Aug. 9, 2007

Related U.S. Application Data

(63) Continuation-in-part of application No. 11/406,667, filed on Apr. 19, 2006.

(60) Provisional application No. 60/864,532, filed on Nov. 6, 2006, provisional application No. 60/735,269, filed on Nov. 11, 2005, provisional application No. 60/703,140, filed on Jul. 28, 2005.

(51) Int. Cl.
*H04L 27/06* (2006.01)
(52) U.S. Cl. .................. 375/256; 375/262; 375/341
(58) Field of Classification Search ............... 375/259, 375/260, 261, 262, 341, 316; 370/338, 465, 370/464, 280, 281, 310
See application file for complete search history.

(56) References Cited

U.S. PATENT DOCUMENTS

| 4,206,423 | A | * | 6/1980 | Nossen | 332/104 |
|---|---|---|---|---|---|
| 4,979,041 | A | * | 12/1990 | Schreiber | 375/240.25 |
| 5,131,008 | A | * | 7/1992 | Kazecki et al. | 375/344 |
| 5,163,057 | A | * | 11/1992 | Grupp | 714/798 |
| 5,260,975 | A | * | 11/1993 | Saito | 375/327 |
| 5,619,524 | A | * | 4/1997 | Ling et al. | 375/130 |
| 5,657,354 | A | * | 8/1997 | Thesling et al. | 375/332 |
| 5,706,428 | A | * | 1/1998 | Boer et al. | 370/342 |
| 5,940,438 | A | * | 8/1999 | Poon et al. | 375/222 |

(Continued)

*Primary Examiner*—Seema S Rao
*Assistant Examiner*—Steven Wood
(74) *Attorney, Agent, or Firm*—Garlick Harrison & Markison; Kevin L. Smith

(57) ABSTRACT

A radio frequency receiver for discriminating a modulation type to decode a signal field of an encoded signal in a wireless communication system. The radio frequency (RF) receiver receives an encoded signal having a preamble training sequence associated with a frame, the preamble training sequence including the signal field. The radio frequency receive generates at least a first log-likelihood ratio (LLR) stream and a second LLR stream for each of a plurality of sub-symbols for a predetermined portion of the received encoded signal based upon an m-bit wide modulation reference, wherein m represents the bit width of the modulation reference. The first LLR stream and the second LLR stream each include a plurality of LLR values. The plurality of LLR values of the first LLR stream are summed to produce a first cumulative LLR, and the plurality of LLR values of the second LLR stream are summed to produce a second cumulative LLR. The first cumulative LLR is discriminated with the second cumulative LLR to produce a discriminated modulation type output. The receiver decodes the signal field based on the discriminated modulation type output.

24 Claims, 16 Drawing Sheets

U.S. PATENT DOCUMENTS

| | | | |
|---|---|---|---|
| 6,009,073 A * | 12/1999 | Kaneko | 370/203 |
| 6,052,406 A * | 4/2000 | Epstein et al. | 375/134 |
| 6,192,070 B1 * | 2/2001 | Poon et al. | 375/222 |
| 6,363,106 B1 * | 3/2002 | Popovic et al. | 375/150 |
| 6,396,878 B1 * | 5/2002 | Piirainen | 375/262 |
| 6,456,627 B1 * | 9/2002 | Frodigh et al. | 370/465 |
| 6,526,107 B1 * | 2/2003 | Katoh et al. | 375/368 |
| 6,687,841 B1 * | 2/2004 | Marukawa | 713/500 |
| 6,697,443 B1 * | 2/2004 | Kim et al. | 375/341 |
| 6,772,389 B2 * | 8/2004 | Kim et al. | 714/780 |
| 6,934,342 B1 * | 8/2005 | Ishii et al. | 375/316 |
| 6,999,531 B2 * | 2/2006 | Jin | 375/341 |
| 7,020,827 B2 * | 3/2006 | Gatherer et al. | 714/786 |
| 7,050,768 B2 * | 5/2006 | Hosur et al. | 455/103 |
| 7,054,288 B2 * | 5/2006 | Sternberg et al. | 370/329 |
| 7,075,970 B2 * | 7/2006 | Maru | 375/140 |
| 7,116,732 B2 * | 10/2006 | Worm et al. | 375/341 |
| 7,131,049 B2 * | 10/2006 | Kim et al. | 714/751 |
| 7,173,979 B1 * | 2/2007 | Badri et al. | 375/308 |
| 7,281,192 B2 * | 10/2007 | Shen et al. | 714/757 |
| 7,302,012 B2 * | 11/2007 | Kim et al. | 375/316 |
| 7,359,311 B1 * | 4/2008 | Paranjpe et al. | 370/203 |
| 7,362,802 B2 * | 4/2008 | Saed | 375/229 |
| 7,386,073 B2 * | 6/2008 | Chang | 375/344 |
| 7,430,257 B1 * | 9/2008 | Shattil | 375/347 |
| 7,440,517 B1 * | 10/2008 | Henne et al. | 375/324 |
| 2002/0080510 A1 * | 6/2002 | Maru | 360/46 |
| 2003/0002603 A1 * | 1/2003 | Worm et al. | 375/341 |
| 2003/0053568 A1 * | 3/2003 | Rad et al. | 375/341 |
| 2003/0103585 A1 * | 6/2003 | Kim et al. | 375/340 |
| 2005/0036574 A1 * | 2/2005 | Chang | 375/344 |
| 2005/0058193 A1 * | 3/2005 | Saed | 375/232 |
| 2005/0084040 A1 * | 4/2005 | Stewart et al. | 375/324 |
| 2005/0152473 A1 * | 7/2005 | Maltsev et al. | 375/299 |
| 2005/0180344 A1 * | 8/2005 | Sternberg et al. | 370/310 |
| 2005/0190736 A1 * | 9/2005 | Zory et al. | 370/342 |
| 2005/0286654 A1 * | 12/2005 | Tanrikulu et al. | 375/316 |
| 2006/0114981 A1 * | 6/2006 | Ghosh et al. | 375/232 |
| 2007/0025392 A1 * | 2/2007 | Moorti et al. | 370/465 |
| 2007/0041473 A1 * | 2/2007 | Chen et al. | 375/329 |
| 2007/0047666 A1 * | 3/2007 | Trachewsky | 375/267 |
| 2007/0058623 A1 * | 3/2007 | Moorti et al. | 370/389 |
| 2007/0058709 A1 * | 3/2007 | Chen et al. | 375/231 |
| 2007/0110191 A1 * | 5/2007 | Kim et al. | 375/340 |
| 2007/0121764 A1 * | 5/2007 | Chen et al. | 375/340 |

* cited by examiner communication system 10 frame formats of inbound RF signal 116

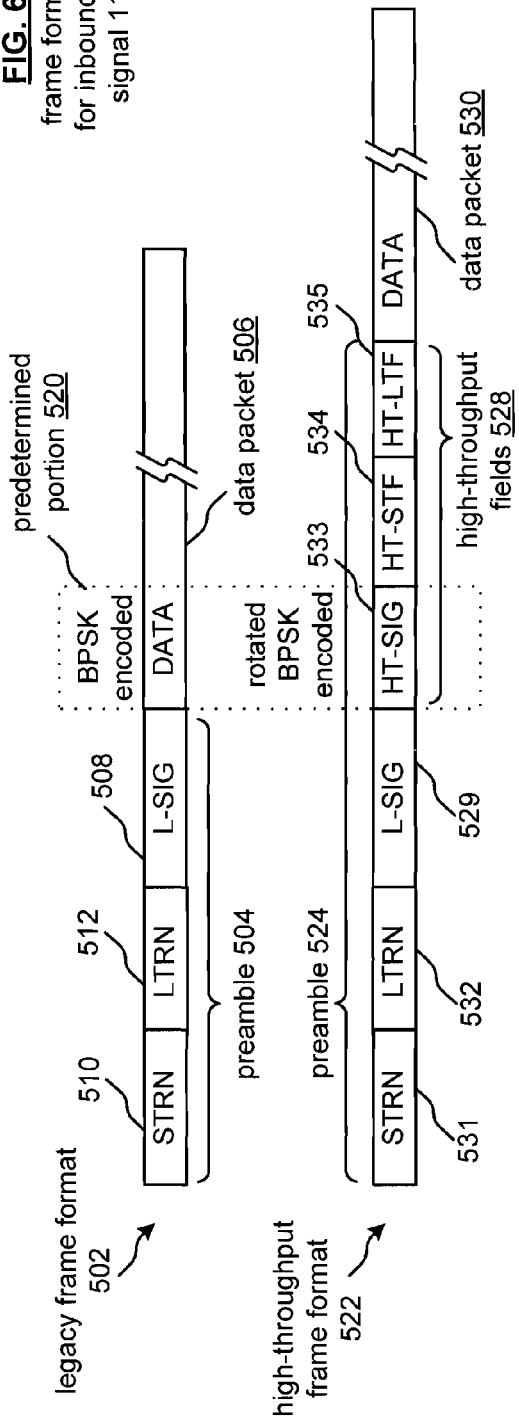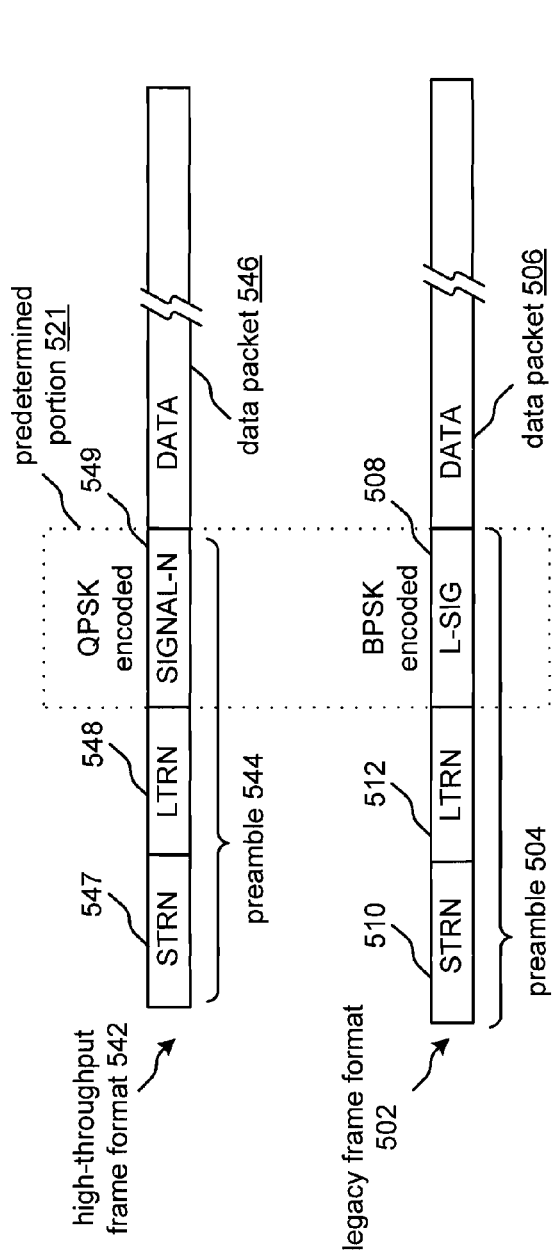

FIG. 9
result table 700 specified modulation types = {BPSK, rotated-BPSK, QPSK}

| comparison result 225 | cumulative soft metric 224 | modulation type output 228 |
|---|---|---|
| favorable | 224(1) ≈ 224(2) | QPSK |
| unfavorable | 224(1) > β224(2) | BPSK |
| unfavorable | 224(1) < β224(2) | rotated BPSK |

702
704
706

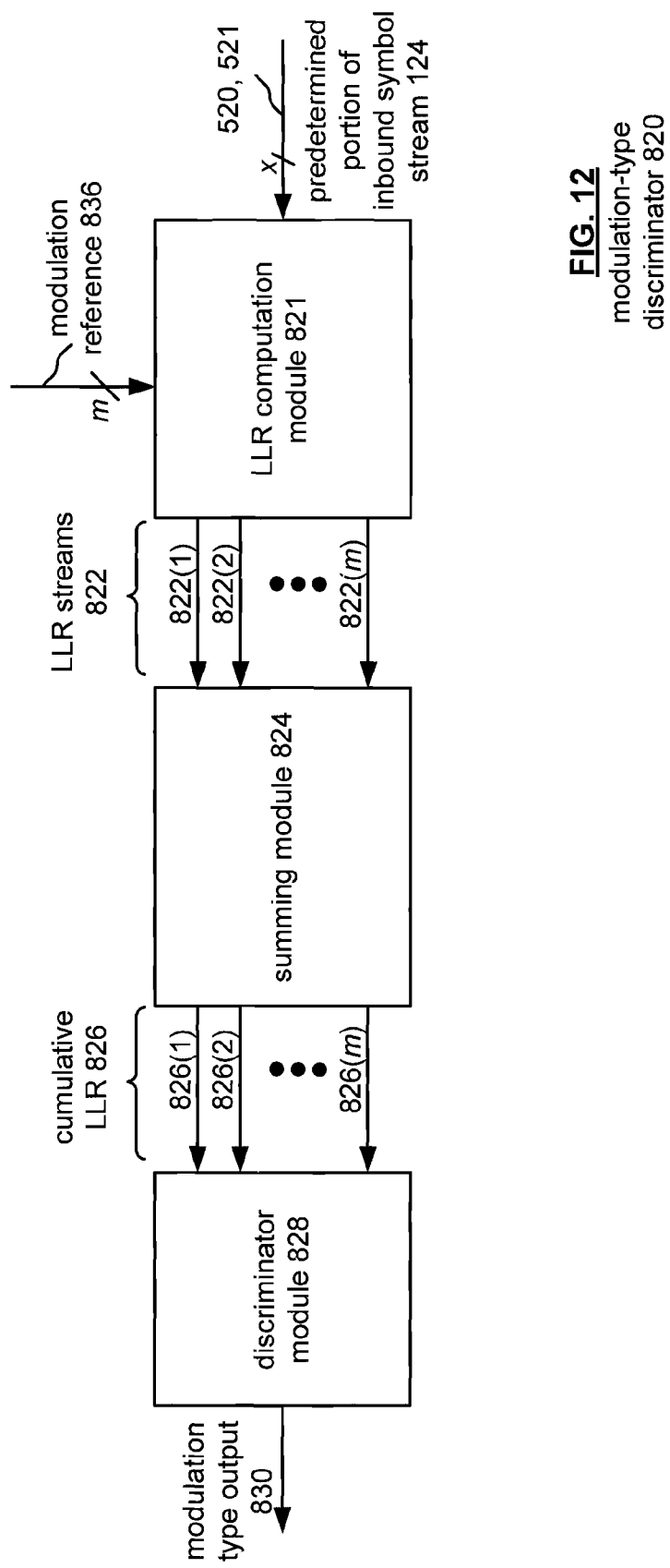

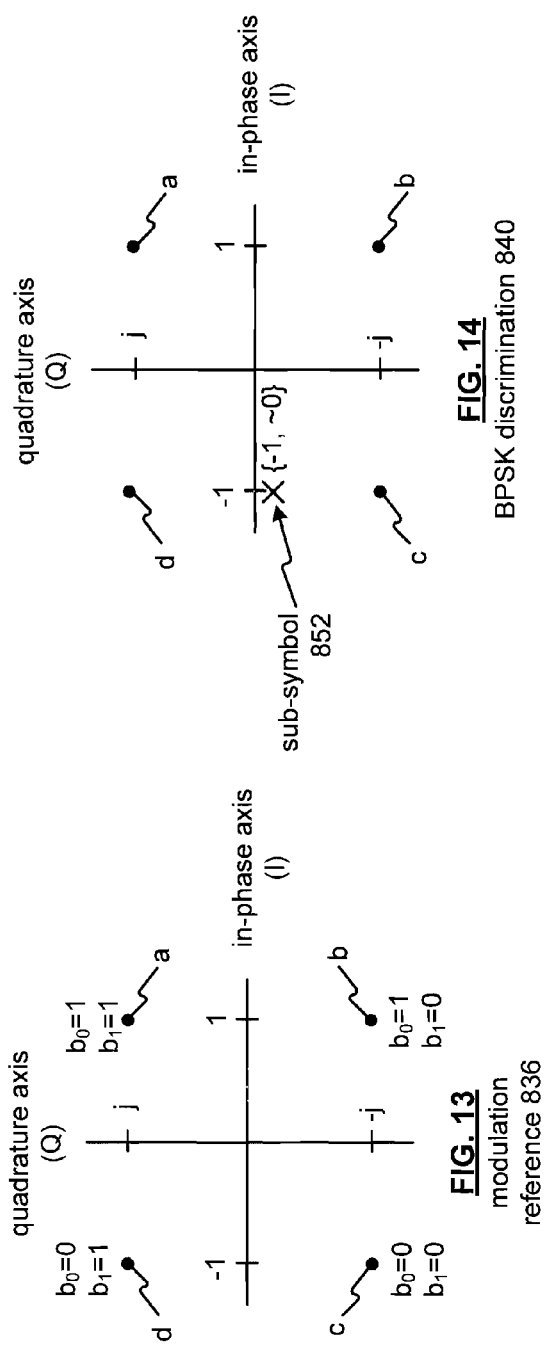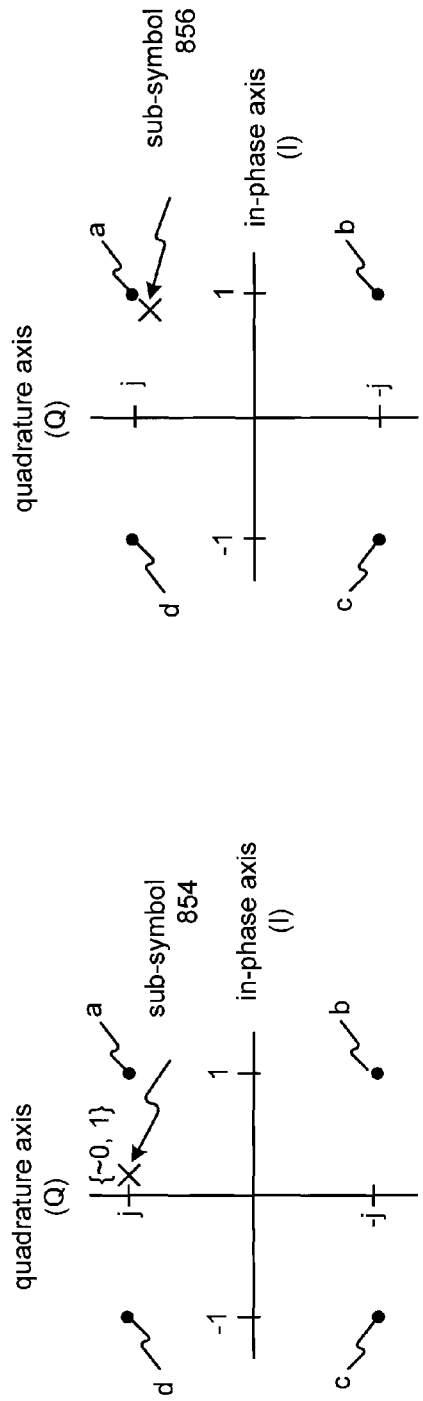

FIG. 17
result table 850 modulation reference 836 = QPSK
specified modulation types = {BPSK, rotated-BPSK, QPSK}

| comparison result | cumulative LLR 826 (soft metric) | modulation type output 830 |
|---|---|---|
| favorable | $826(1) \approx 826(2)$ | QPSK |
| unfavorable | $826(1) > \beta 826(2)$ | BPSK |
| unfavorable | $826(1) < \beta 826(2)$ | rotated BPSK |

MODULATION-TYPE DISCRIMINATION IN A WIRELESS COMMUNICATION NETWORK

CROSS REFERENCE TO RELATED APPLICATION

This application claims priority to U.S. Provisional Application Ser. No. 60/864,532, filed Nov. 6, 2006, and is a continuation-in-part of U.S. application Ser. No. 11/406,667, filed Apr. 19, 2006, each of which are hereby incorporated herein by reference in their entirety for all purposes.

BACKGROUND

1. Technical Field

The present invention relates to wireless communications and, more particularly, modulation type discrimination for a received communication signal.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency (RF) carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

An issue that exists for digital receivers is to have the capability of receiving various frame formats with different data structures. Often, a transmitter will adjust the transmission modulation-type to one of many based upon a number of considerations, such as signal interference levels, data rate, etc. A receiver, however, does not have a priori knowledge of the modulation-type of the pertinent portion of a received data frame—that is, knowledge of the modulation-type is not self-evident or capable of being determined without examination of the received signal. Thus, a need exists for discriminating modulation types of the received data frame in view of various frame formats supporting differing data throughput to allow the receiver to properly decode or decipher an incoming signal.

SUMMARY

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 6 illustrates frame formats of encoded signals using a predetermined portion for modulation-type discrimination according to an embodiment of the invention;

FIG. 7 illustrates other frame formats of encoded signals using a second predetermined portion for modulation-type discrimination according to an embodiment of the invention;

FIG. 9 is a table illustrating the operation of the discriminator module of FIG. 6;

FIG. 12 is a block diagram of a modulation-type discriminator according to an embodiment of the invention;

FIG. 13 is an illustration of a modulation reference constellation according to an embodiment of the invention;

FIG. 14 illustrates an example of BPSK modulation discrimination according to an embodiment of the invention;

FIG. 15 illustrates an example of rotated-BPSK modulation discrimination according to an embodiment of the invention;

FIG. 16 illustrates an example of QPSK modulation discrimination according to an embodiment of the invention;

FIG. 17 is a result table illustrating the operation functional state of the modulation-type discriminator of FIG. 12.

DETAILED DESCRIPTION OF THE DRAWINGS

The embodiments provided may be practiced in a variety of settings that implement a modulation-type discrimination of a signal field via a predetermined portion (for example, the signal field, a portion of the data packet, et cetera) of a received encoded signal, such as in a wireless LAN or other packet-based data networks.

For example, a transmitter transmits an encoded signal having a preamble training sequence that is associated with a data packet. The encoded signal is made up of a plurality of symbols. Generally, the configuration settings of the data packet such as length and modulation type are contained in the signal field, which may be considered a part of the preamble training sequence. Because these configuration settings are necessary for decoding the data packet, the source station encodes the signal field using a robust modulation type (for example, binary phase shift key ("BPSK"), rotated BPSK, quaternary phase shift keying ("QPSK"), et cetera).

Within a wireless LAN environment, various frame formats exist for backwards compatibility purposes (and have lower data-throughput characteristics), as well as those formats for higher data-throughput purposes. Accordingly, the modulation type of the signal field may differ among the various frame formats. Furthermore, the signal field portion of one frame format may coincide with the data portion of another frame format.

A receiver, having high-throughput capability, receives these encoded signals, and without a priori knowledge of the underlying frame formats and modulation scheme of the received encoded signal, must discriminate the modulation-type of the pertinent portion before decoding the received signal. The resulting discriminated modulation-type is used to decode the signal field contents, which are then used for further processing and/or decoding of the associated data packet, such as by a digital receiver processing module, to provide outbound data for use by a host device.

Generally, the modulation type for an encoded signal and its constituent symbols may be one of many, and is discriminated through use of soft-metric methodologies that present a level of confidence to an estimation of a transmitted symbol. With this understanding, the examples below are described in reference to discriminating a modulation type of a received encoded signal. Furthermore, although a variety of different systems and components may be implemented, a particular system implementation is illustrated in FIG. 1.

Figure 1:
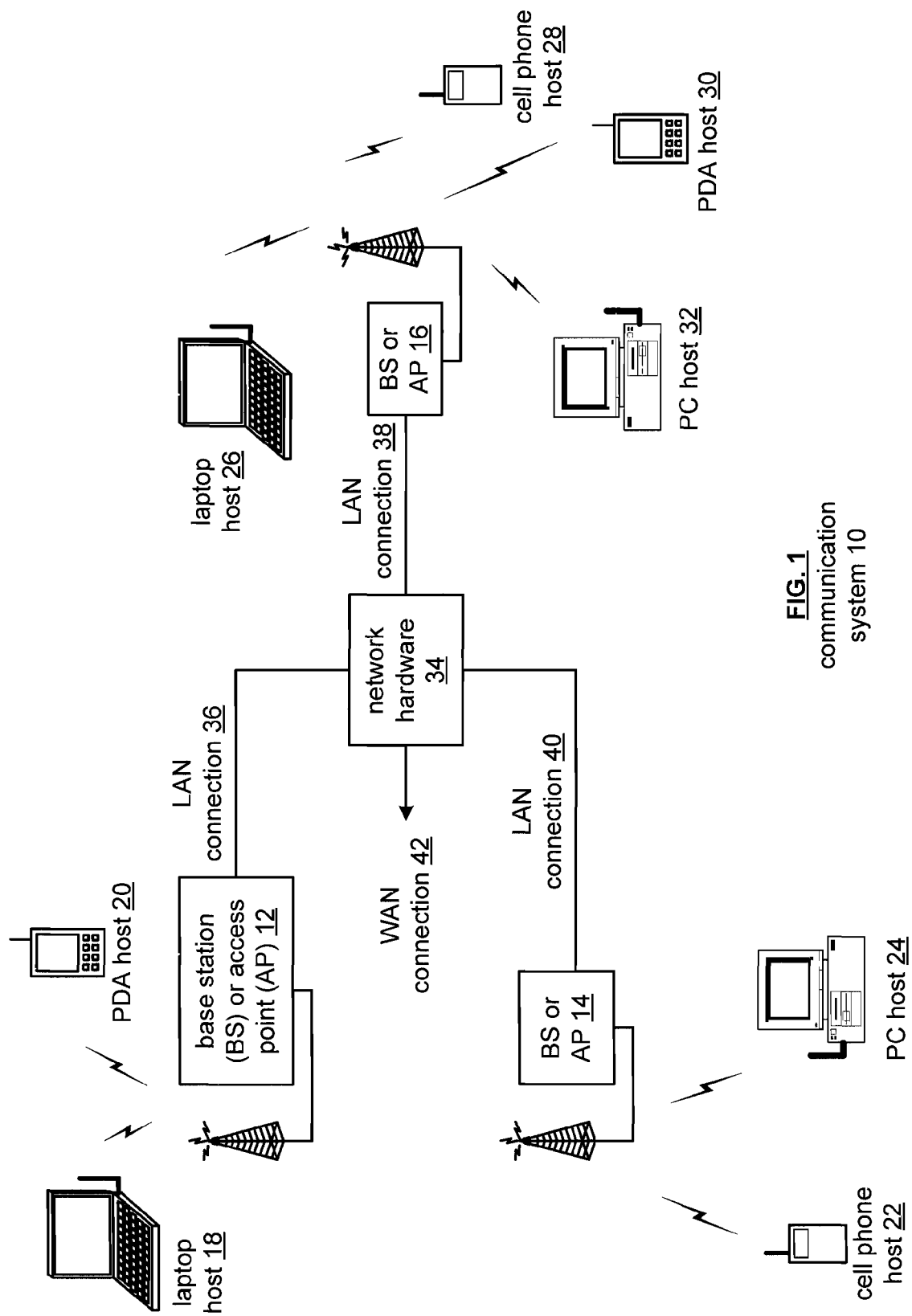
FIG. 1 is a functional block diagram illustrating a communication system that includes a plurality of base stations or access points, a plurality of wireless communication devices, and a network hardware component.

FIG. 1 is a functional block diagram illustrating a communication system 10 that includes a plurality of base stations or access points 12, 14, and 16, a plurality of wireless communication devices 18, 20, 22, 24, 26, 28, 30, 32, and a network hardware component 34. The wireless communication devices 18 through 32 may be laptop host computers 18 and 26, personal digital assistant hosts 20 and 30, personal computer hosts 24 and 32, and/or cellular telephone hosts 22 and 28. The details of the wireless communication devices will be described in greater detail with reference to FIGS. 2 and 3.

The base stations or access points 12 through 16 are operably coupled to the network hardware component 34 via local area network (LAN) connections 36, 38, and 40. The network hardware component 34, which may be a router, switch, bridge, modem, system controller, etc., provides a wide area network (WAN) connection 42 for the communication system 10. Each of the base stations or access points 12 through 16 has an associated antenna or antenna array to communicate with the wireless communication devices in its area. Typically, the wireless communication devices 18 through 32 register with the particular base station or access point 12 through 16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Any one of the wireless communication devices of FIG. 1 may employ the modulation-type discriminator of the present invention as is described in greater below. Thus, a wireless communication device (such as those of FIG. 1) having a high-throughput data capability that is in communication with one of the other wireless communication device within a basic service set, the receiver of the device may require discriminating the modulation of the received encoded signal to access and process components of the received signal, and in turn, decode the accompanying data packet. Thus, according to one embodiment, PC host 32 includes circuitry and logic for the described embodiments of a modulation-type discriminator.

Figure 2:
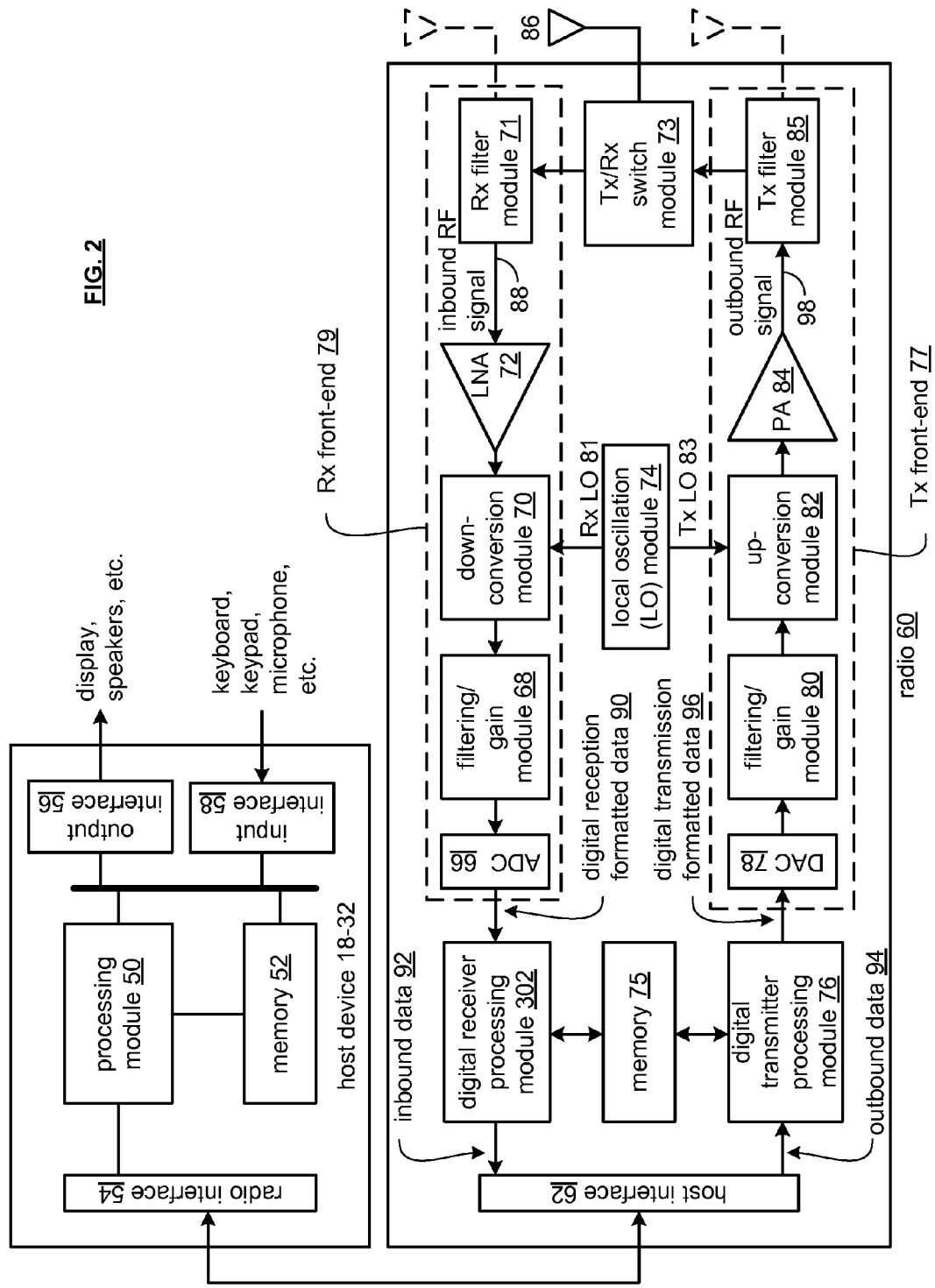
FIG. 2 is a schematic block diagram illustrating a wireless communication device that includes the host device, provided by a host device and an associated radio, according to an embodiment of the invention.

FIG. 2 is a schematic block diagram illustrating a wireless communication device that includes a host device (provided by host device 18 through 32), and an associated radio 60. For cellular telephone hosts, radio 60 is a built-in component. For personal digital assistant hosts, laptop hosts and/or personal computer hosts, the radio 60 may be built-in or an externally coupled component.

As shown, the host device 18 through 32 includes a processing module 50, a memory 52, a radio interface 54, an input interface 58 and an output interface 56. The processing module 50 and memory 52 execute the corresponding instructions that are typically performed by the host device 18 through 32. For example, for a cellular telephone host device, the processing module 50 performs the corresponding communication functions in accordance with its particular cellular telephone standard.

The radio interface 54 data can be received from and sent to the radio 60. For data received from the radio 60 (for example, inbound data), the radio interface 54 provides the data to the processing module 50 for further processing and/or routing to the output interface 56. The output interface 56 provides connectivity to an output device such as a display, monitor, speakers, etc., such that the received data may be displayed. The radio interface 54 also provides data from the processing module 50 to the radio 60. The processing module 50 may receive the output data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a receive signal path circuitry and transmit signal path circuitry. The receive signal path circuitry includes the digital receiver processing module 302 and a receive component 79. The receive front-end 79 includes an analog-to-digital converter (ADC) 66, a filtering/gain module 68, a down-conversion module 70, a low noise amplifier 72, and a receive (Rx) filter module 71. The transmit signal path circuitry includes a digital transmitter processing module 76 and a transmit front-end 77. The transmit front-end 77 includes a digital-to-analog converter (DAC) 78, a filtering/gain module 80, an intermediate frequency (IF) mixing up-conversion module 82, a power amplifier (PA) 84, and a transmit (Tx) filter module 85. Also included with the radio 60 is a transmitter/receiver (Tx/Rx) switch module 73, a local oscillation module 74, and a memory 75. The antenna 86 is operably coupled such that it is shared with the transmit and receive signal path circuitry, which is regulated by the Tx/Rx switch module 73. Note that the antenna implementation will depend on the particular standard to which the wireless communication device is compliant.

The digital receiver processing module 302 and the digital transmitter processing module 76, in combination with operational instructions stored in memory 75, execute digital receiver functions and digital transmitter functions, respectively. The digital receiver functions include, but are not limited to, demodulation, constellation demapping, decoding and/or descrambling. The digital transmitter functions include, but are not limited to, scrambling, encoding, constellation mapping, and/or modulation. The digital receiver and transmitter processing modules 302 and 76, respectively, may be implemented using a shared processing device, individual processing devices, or a plurality of processing devices. Such a processing device may be a microprocessor, a micro-controller, a digital signal processor, a micro-computer, a central processing unit, a field programmable gate array, programmable logic device, a state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory (ROM), random access memory (RAM), volatile memory, non-volatile memory, static memory, dynamic memory, and/or any device that stores digital information. Note that when the digital receiver processing module 302 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 302 and/or the digital transmitter processing module 76 execute, operational instructions corresponding to at least some of the functions illustrated herein.

In operation, the radio 60 receives outbound data 94 from the host device 18 through 32 via the host interface 62. The host interface 62 routes the outbound data 94 to the digital transmitter processing module 76, which processes the outbound data 94 in accordance with a particular wireless communication standard specification (for example, IEEE 802.11a, IEEE 802.11b, IEEE 802.11g, Bluetooth, etc.) to produce digital transmission formatted data 96. The digital transmission formatted data 96 will be a digital baseband signal or a digital low IF signal, where the low IF signal typically will be in the frequency range of 100 kilohertz to a few megahertz.

With respect to the transmit front-end 77, the digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal or low IF signal into a radio frequency (RF) signal based on a Tx local oscillation (LO) 83 provided by the local oscillation (LO) module 74. The local oscillation module 74 is, in one embodiment of the invention, a multi-stage mixer. A power amplifier 84 amplifies the RF signal to produce the outbound RF signal 98, which is filtered by the transmitter filter module 85. The antenna 86 transmits the outbound RF signal 98 to a targeted device, such as a base station, an access point, and/or another wireless communication device.

The receive front-end 79 of the radio 60 receives an inbound RF signal 88 via the antenna 86. The inbound RF signal 88 was transmitted by a base station, an access point, or another wireless communication device.

The antenna 86 provides the inbound RF signal 88 to the receiver filter module 71 via the Tx/Rx switch module 73, where the Rx filter module 71 bandpass-filters the inbound RF signal 88. The Rx filter module 71 provides the filtered RF signal to low noise amplifier (LNA) 72, which amplifies the inbound RF signal 88 to produce an amplified inbound RF signal. The LNA 72 provides the amplified inbound RF signal to the down-conversion module 70, which directly converts the amplified inbound RF signal into an inbound low IF signal or baseband signal based on a receiver local oscillation 81 provided by local oscillation module 74. The local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented to filter and/or attenuate the inbound low IF signal or the inbound baseband signal to produce a filtered inbound signal.

The ADC 66 converts the filtered inbound data from the analog domain to the digital domain to produce digital reception formatted data 90. The digital receiver processing module 302, decodes, descrambles, demaps, and/or demodulates the digital reception formatted data 90 to recapture inbound data 92 in accordance with the particular wireless communication standard being implemented by the radio 60. The host interface 62 provides the recaptured inbound data 92 to the host device 18 through 32 via the radio interface 54.

As should be readily appreciated by one of skill in the art, the wireless communication device of FIG. 2 may be implemented using one or more integrated circuits. For example, the host device may be implemented by a first integrated circuit, while the digital receiver processing module 302, the digital transmitter processing module 76, and the memory 75, may be implemented on a second integrated circuit, and the remaining components of the radio 60, less the antenna 86, may be implemented on a third integrated circuit, to provide an integrated circuit radio transceiver. As yet another example, the processing module 50 of the host device 18 through 32 and the digital receiver processing module 302 and the digital transmitter processing module 76 may be a common processing device implemented on a single integrated circuit. Further, memory 52 and memory 75 may be implemented on a single integrated circuit and/or on the same integrated circuit as the common processing modules of the processing modules 50, the digital receiver processing module 302, and the digital transmitter processing module 76.

The wireless communication device of FIG. 2 is one that may be implemented to include either a direct conversion from RF-to-baseband and baseband-to-RF or for a conversion by way of a low intermediate frequency (IF). Accordingly, the LO module 74 includes circuitry for adjusting an output frequency of a local oscillation signal provided therefrom. The LO module 74 receives a frequency correction input that it uses to adjust an output local oscillation signal to produce a frequency corrected local oscillation signal output. While LO module 74, up-conversion module 82 and down-conversion module 70 are implemented to perform direct conversion between baseband and RF, it is understood that the principles herein may also be applied readily to systems that implement an IF conversion step at a low intermediate frequency.

Within host device 18 through 32, as shown in FIG. 2, multiple applications for an analog-to-digital converter exist. First, an RF must be converted to a digital signal by an analog-to-digital converter, such as ADC 66, for subsequent processing by the digital receiver processing module 302. Additional, however, analog-to-digital converters may also be used for providing signal magnitude and phase information logic or to a processing module, such as a front-end processor, for circuit calibration purposes.

Figure 3:
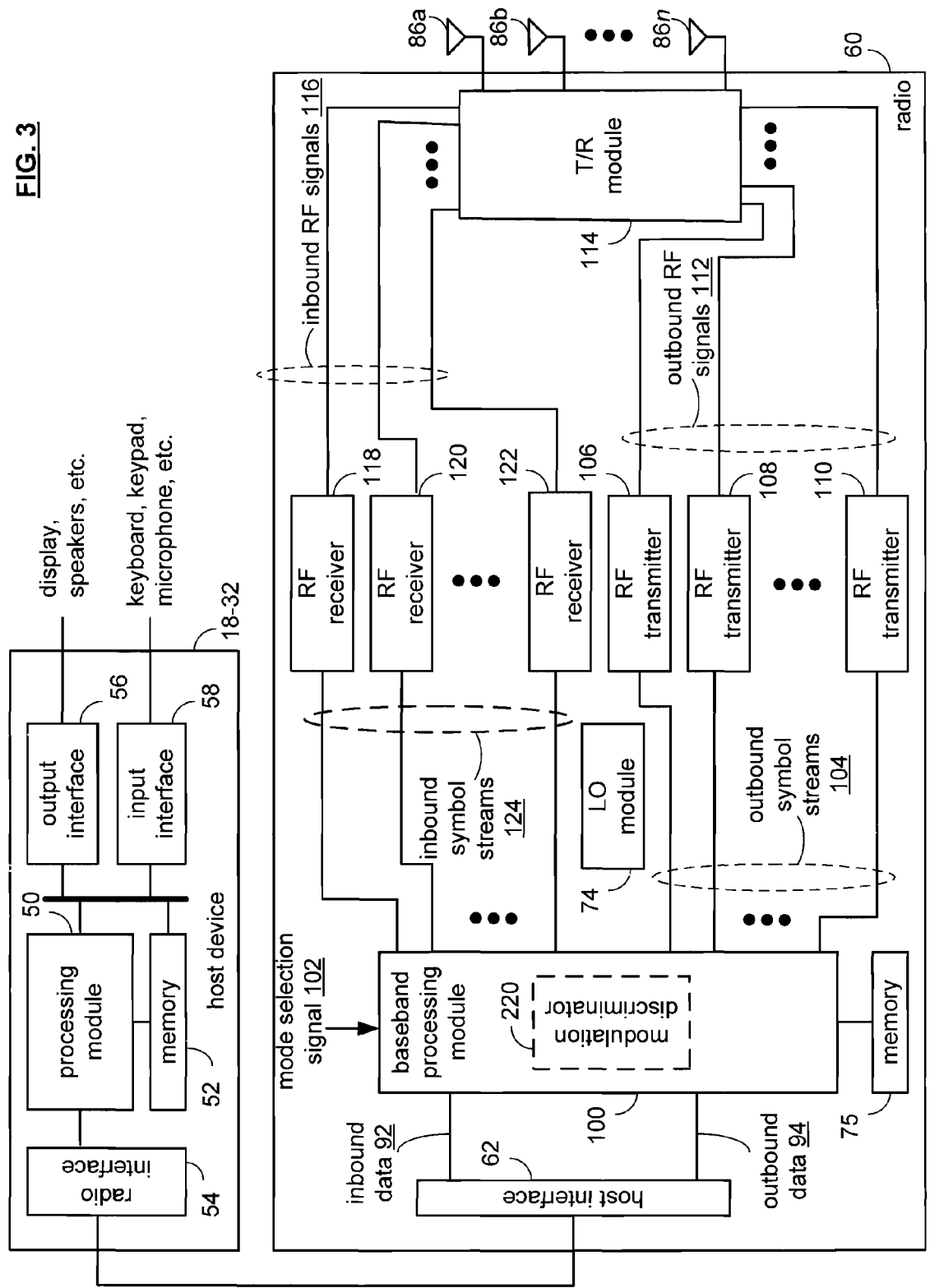
FIG. 3 is a schematic block diagram illustrating a wireless communication device that includes a host device and an associated radio according to an embodiment of the invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, a plurality of radio frequency (RF) transmitters 106-110, a transmit/receive (T/R) module 114, a plurality of antennas 86a, 86b, to 86n, a plurality of RF receivers 118-122, and a local oscillation module 74.

The baseband processing module 100, in combination with operational instructions stored in memory 75, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module includes a modulation-type discriminator 220 to discriminate the modulation type of a predetermined portion of the received signal. The modulation-type discriminator 220 is further described with respect to FIGS. 4 through 10.

The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 25 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK ("Complementary Code Keying"), 16 QAM ("Quadrature Amplitude Modulation") and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102, produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates two, three or four antennas, the baseband processing module 100 will produce two, three or four outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 86a, 86b, to 86n.

When the radio 60 is in the receive mode, the transmit/receive module 114 receives one or more inbound RF signals 116 via the antennas 86a, 86b, to 86n and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of ordinary skill in the art will appreciate, the wireless communication device of FIG. 3 may be implemented using one or more integrated circuits. For example, the host device may be implemented on a first integrated circuit, the baseband processing module 100 and memory 75 may be implemented on a second integrated circuit, and the remaining components of the radio 60, less the antennas 86a, 86b, to 86n, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 75 may be implemented on a single integrated circuit and/or on the same integrated circuit as the common processing modules of processing module 50 and the baseband processing module 100.

Figure 4:
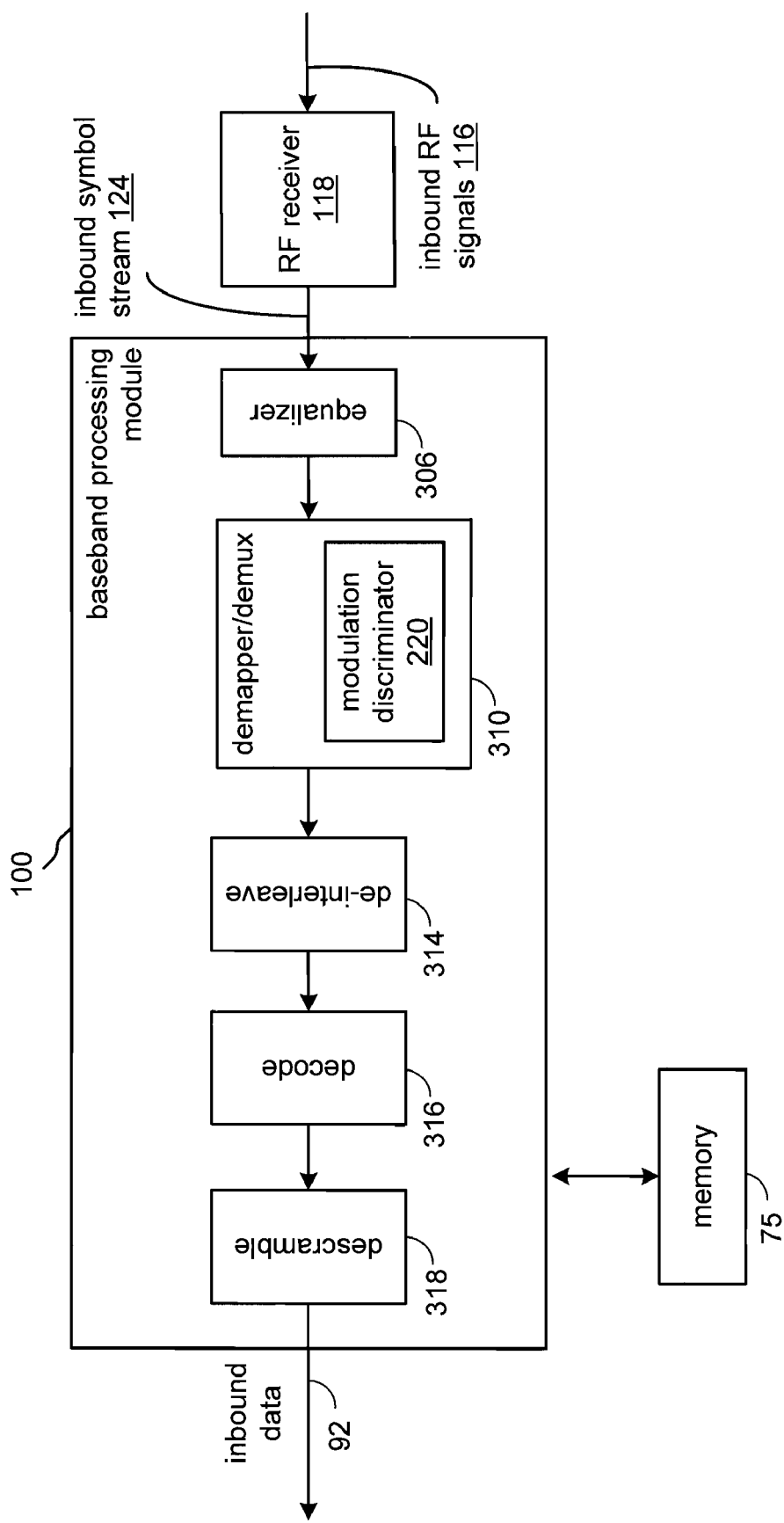
FIG. 4 is a functional block diagram of a digital receiver module according to an embodiment of the invention.

FIG. 4 is a functional block diagram of the baseband processing module 100 with a receiver path that includes an equalizer 306, a demapper/demux 310, a de-interleave 314, a decode 316, and a descramble 318. The demapper/demux 310 includes functional components providing a modulation-type discriminator 220.

The baseband processing module 100 is coupled to receive an RF signal from the antenna 86a, which is representative of the one or more inbound RF signals 116 via the antennas 86a, 86b, to 86n and provides them to one or more RF receivers 118-122. For this example, receiver 118 is shown. The RF signal was transmitted as an encoded signal having a predetermined portion that utilizes one or several of a plurality of modulation types, such as BPSK, rotated BPSK, QPSK, QAM, etc., and was transmitted over a channel that carries symbols from the transmitter to the receiver. The channel is serviced by a wired, wireless, optical, or another media, depending upon the communication system type. Generally, the wireless channel distorts the symbols of the inbound RF signal 116 during transmission, from the perspective of the receiver, causing interference between a subject symbol and a plurality of symbols surrounding the subject symbol. This type of distortion is referred to as "inter-symbol-interference" and is, generally speaking, the time-dispersed receipt of multiple copies the symbols caused by multipath interference. The wireless channel also introduces noise into the symbols prior to their receipt. The receive path modules are operable to compensate for these adverse transmission effects and process the RF signal 116.

The RF receiver 118 is coupled to provide the received encoded signal as an inbound symbol stream 124 to the equalizer 306. The equalizer 306 removes and/or mitigates the channel effects on a received symbol stream of the RF signal. In operation, the equalizer 306 performs channel inversion to produce noisy estimates of the transmitted symbols. In a MIMO system, the equalization process separates out the streams so that each can be treated independently.

The equalizer 306 output is provided to the demapper/demux 310 that includes a modulation-type discriminator 220. The constellation demapper/demux 310 produces soft metrics (or soft decisions) that generally correlate to the transmitted symbols.

From the demapper/demux 310, the de-interleave 314 serves to de-interleave the output of the demapper/demux 310, placing the data in the sequence existing prior to the interleaving process by the transmission source. Generally, an encoded signal will be interleaved at a transmitter, such as under WLAN standards specifications. The de-interleaved output is provided to the decode 316, which may be provided as a Viterbi decoder, or other decoder acceptable to the communications standards specifications. The decoded bits are then descrambled at descramble 318. The resulting data bits are output as inbound data 92.

In operation, the RF receiver 118 (or RF receivers 118-122, depending upon the number of streams) receives an encoded signal in an analog form represented as inbound RF signals 116. The encoded signal has a preamble training sequence associated with a data packet. Further to this example, the RF receiver 118 converts the inbound RF signal 116 of the encoded signal into a corresponding inbound symbol stream 124. Generally, the configuration settings of the data packet such as length and modulation type are contained in the signal field, which may be considered a part of the preamble training sequence. Because the configuration settings are necessary for decoding the data packet, the signal field is always encoded using a robust modulation type (for example, binary phase shift key, rotated binary phase shift keying, quaternary phase shift keying, et cetera).

Within a wireless LAN environment, various frame formats exist for backwards compatibility purposes (and lower data-throughput characteristics), as well as those formats for higher data-throughput purposes. Accordingly, the modulation type of the signal field may differ among the various frame formats. Furthermore, the signal field portion of one frame format may coincide with the data portion of another frame format.

A receiver for a radio 60, having high-throughput capability, receives these encoded signals, and without a priori knowledge of the underlying frame formats and modulation scheme of the received encoded signal, must discriminate the modulation-type of the pertinent portion before decoding the data portion for the received signal. The receiver uses the resulting discriminated modulation-type to decode the signal field contents, which the receiver then uses for further processing and/or decoding of the associated data packet of the frame, such as by a digital receiver processing module 302 (see FIG. 2) and/or a baseband processing module 100, to provide inbound data 92 for use by a host device 18-32.

Figure 5:
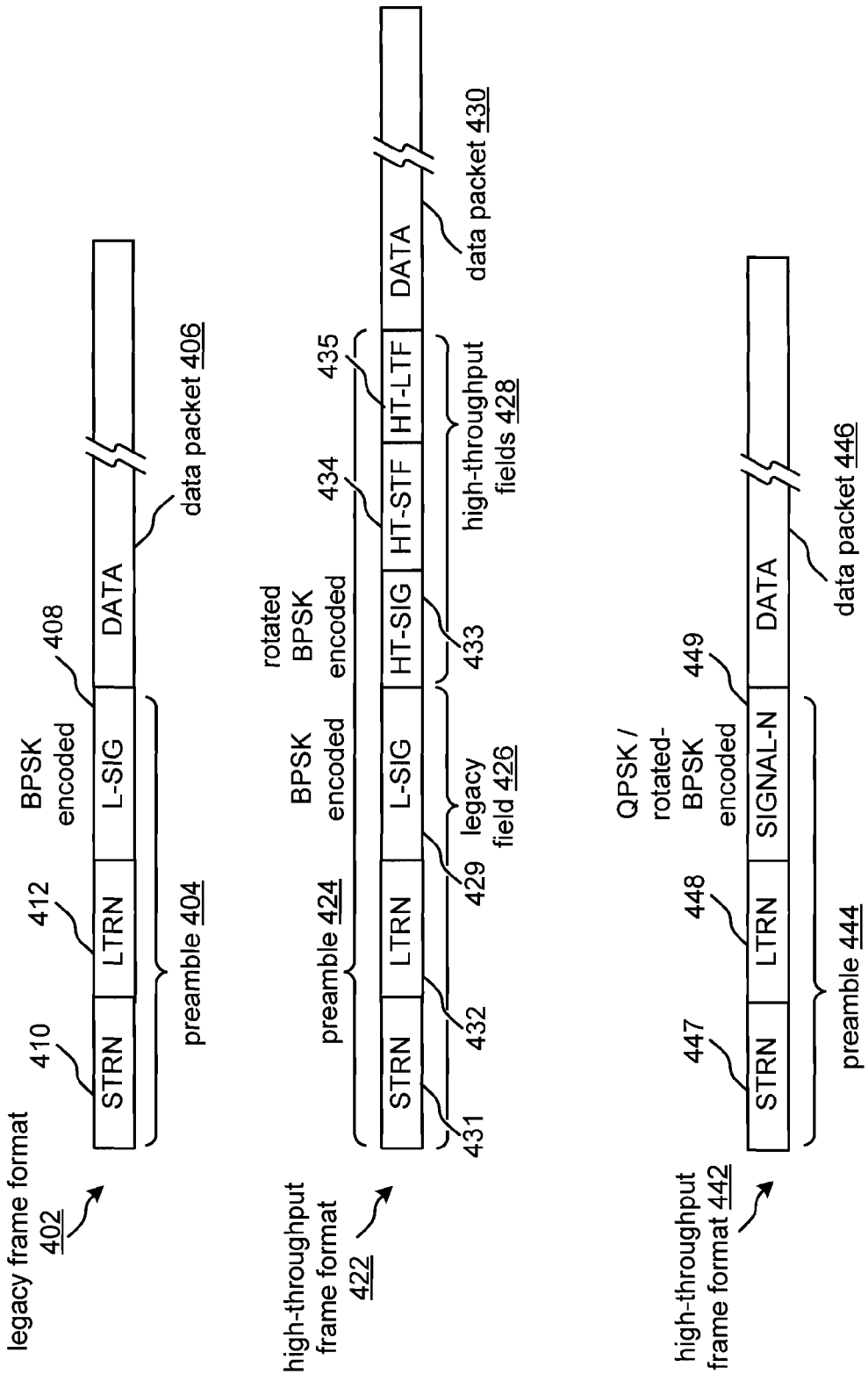
FIG. 5 illustrates frame formats of encoded signals having signal fields with varying modulation types according to an embodiment of the invention.

Preamble training sequences and structures of the encoded signal are discussed in further detail with respect to FIGS. 5 and 7. The modulation-type discriminator 220 determines, or discriminates the modulation type for the signal field at the outset to allow for decoding of the encoded signal and the associated data. The signal field specifies the data configuration and length-related parameters for the data carried by the encoded signal. Generally, the baseband processor 100 performs the reverse operations of a transmitter with training overhead—for example, estimating a frequency offset and the symbol timing with respect to the received encoded signal. The training activity is conducted through use of a preamble training sequence.

FIG. 5 illustrates frame formats of encoded signals. The encoded signals 400 are examples of frame formats that may be used within a communication system 10 (see FIG. 1). Shown is a legacy frame format 402, a high-throughput frame format 422 and a high-throughput frame format 442. The frame formats have at least two components—a preamble training sequence and a data packet.

Generally, the preamble training sequences contain known training symbols, in accordance with one or more standards specifications, to provide for estimation of the wireless communication channel. The preamble provides sufficient information for packet detection, frequency offset estimation, symbol timing, and channel estimation. Furthermore, in WLANs, for example, the preamble training sequence is added to every data packet 406, 430 and 446 prior to transmission. As part of the synchronization processes, the preamble training sequence have short training symbols STRN, long training symbols LTRN, and a signal field. In general, the short training symbols STRN (generally about 10 periods of 0.8 microseconds each in one embodiment of the invention), are used to detect the start-of-frame, gain control sequence (to place the signal in a range suitable for detection), carrier frequency offset, symbol recovery, etc. The long training symbol LTRN (for example, in OFDM techniques, generally having 2 periods of a training symbol each being four microseconds) provide information for channel estimation and fine improvements to receiver performance. The signal fields 408, 433, and 449 are modulated, and contain configuration info necessary for decoding the data packets 406, 430, and 446 respectively.

The frame formats 402, 422, and 442 represent frame formats that may be used in a wireless local area network (WLAN) providing systems with enhanced data capability and throughput. It should be noted, however, that these frame formats are provided as examples, and that other frame formats having a preamble training sequence with data packet structure for packet-based communications systems may be used.

The legacy frame format 402 has a preamble 404 and a data packet 406. The preamble 404 has a short training sequence STRN 410, a long training sequence LTRN 412, and a signal field 408, shown as a legacy signal field (L-SIG). In general, the legacy frame format 402 illustrates a prevalent format used for data communications. For example, such formats are used in IEEE 802.11a, which has a maximum raw data rate of 54 Mbit/s, which yields realistic "net achievable throughput" in the mid-20 Mbit/s.

The high-throughput frame format 422 has a preamble 424 and a data packet 430. The preamble 424 has a legacy field 426 and a high-throughput field 428. The legacy field 426 allows a receiver to receive these high-throughput frames by legacy devices. The legacy field 426 has a short training sequence STRN 431, a long training sequence LTRN 432, and a legacy signal field (L-SIG) 429. The high-throughput field 428 has a high-throughput signal field HT-SIG 433, a high-throughput short training field HT-STF 434, and a high-throughput long training field HT-LTF 435.

The high-throughput frame format 442 has a preamble 444 and a data packet 446. A legacy, or backwards compatible, portion is not present. The preamble 444 has a short training sequence STRN 447, a long training sequence LTRN 448, and a signal field 449, shown as a high-throughput signal field (SIGNAL-N).

The source, or transmitting, station encodes the signal fields of the various formats with robust modulation techniques (for example, BPSK, rotated-BPSK, QPSK) to withstand adverse channel effects. Before a signal field for a received frame can be properly decoded, however, the destination, or receiving, station need to determine the modulation type of the signal field. Since the destination station lacks a priori knowledge of the frame format it is receiving, the destination station needs to determine, or discriminate, the modulation type of the signal field on the fly—that is, the discrimination occurs as the signal is being received. Since the location of the signal field (legacy or high-throughput) for each frame format is in a fixed relation with respect to the frame structure, having a priori information regarding the frame structure or formats allows for pre-determining the portion of the received frame to discriminate the modulation type for the signal field.

FIGS. 6 and 7 illustrate predetermined portions of received encoded signals 500 for modulation-type discrimination and the relation of different high-throughput frame formats with respect to legacy frame formats. In the example of FIG. 6, provided is a legacy frame format 502 and a high-throughput frame format 522. The legacy frame format 502 includes a preamble 504 and a data packet 506. The preamble 504 includes a short training sequence 510, a long training sequence 512, and a legacy signal field 508. The high-throughput frame format 522 includes a preamble 524 and a data packet 530. The preamble 524 for the high-throughput frame format 522 includes a short training sequence 531, a long training sequence 532, a legacy signal field 529, and high-throughput fields 528. The high-throughput fields 528 include a high-throughput signal field (HT-SIG) 533, a high-throughput short training field (HT-STF) 534, and a high-throughput long training field (HT-LTF) 535. Because the rate field within the legacy signal field 529 of the high-throughput frame format 522 will correspond to a 6 Mbps data rate in a legacy deployment, an ambiguity arises as to whether the receiver is receiving a legacy frame format 502 (such as the 6 Mega bit-per-second frame format) or a high-throughput frame format 522. In a legacy 6 Mbps frame format, the data packet 506 is BPSK-encoded. To mitigate the ambiguity between the types of frame being received, that is, whether the frame is a legacy frame or a high-throughput frame, portions of a received encoded signal may be discriminated apart from those pertaining to the signal field, such as signal fields 508 and 529. For example, the high-throughput signal field HT-SIG 533 of the high-throughput frame format 522 generally coincides with the start of the data packet 506 for the legacy frame format The modulation of the high-throughput signal field 533 is rotated-BPSK, and the modulation of the data packet 506 is BPSK. The predetermined portion 520 defines the portions of the encoded signals for modulation-type discrimination between the frame formats 502 and 522. With the discriminated modulation type, the receiver is operable to access the information contained in the signal field 508 of the legacy frame format 502 or in the high-throughput signal field 533 of the high-throughput frame format 522.

As noted earlier, the predetermined portion used for modulation-type discrimination is based upon the frame formats that are used. FIG. 7 illustrates the selection of predetermined portions 521 of received signals to distinguish between a high-throughput frame format 542 and a legacy frame format 502.

The high-throughput frame format 542 has a preamble 544 and a data packet 546. The preamble 544 has a short training sequence STRN 547, a long training sequence LTRN 548, and a signal field 549, which is a high-throughput signal field (SIGNAL-N). The predetermined portion 521 coincides with the QPSK-encoded signal field 549 of the high-throughput frame format 542 and the BPSK-encoded signal field 508 of the legacy frame format 502.

As may be appreciated by one of ordinary skill in the art, a radio receiver may provide modulation-type discrimination for additional frame formats as well as having the flexibility to accommodate combinations of possible frame formats within an encoded signal 500. For example, a receiver may be configured to accommodate the legacy frame format 502 and the high-throughput frame format 522 of FIG. 6, provided as a first set, having a first predetermined portion 520. The high-throughput frame format 542 and the legacy frame format 502 of FIG. 7 may be provided as a second set, having a second predetermined portion 521. In this regard, the modulation-type discriminator may provide discrimination of the modulation type of the predetermined portion 520 and the predetermined portion 521 of the first and the second set, respectively, such that the destination station can discriminate the modulation-type for multiple frame sets. When the modulation type of the predetermined portion of either frame format is discriminated, the receiver may discern which frame format is, or is in the process of being received and subsequently decode the data packet. In this manner, the receiver has the capability to accommodate high-throughput transmissions, while also providing backwards-compliant data communications with devices without high-throughput capability.

Also, a further distinction between the first predetermined portion 520 and the second predetermined portion 521 for a received encoded signal may be made through pre-processing activity, as may be appreciated by one of ordinary skill in the art, within the MAC Layer by a Media-specific Access Control (MAC) processor, which may be implemented by the baseband processing module 100. As technological improvements advance with respect to hardware and software speed and power, communications standards specifications are generated or amended to increase data throughput, among other improvements, to communications systems.

It should be noted, however, that the frame formats of FIGS. 6 and 7 are provided as examples, and that other frame formats having a preamble training sequence with data packet structure for other packet-based communications systems may be used. For example, additional structures may be implemented, such as a mid-amble, which may contain a training sequence whose configuration depends on the modulation format used.

Further, as one of ordinary skill in the art will appreciate, the modulation-type discrimination techniques for the frame formats (such as those shown in FIGS. 5 and 6) may be used in the receive signal paths of a variety of network topologies, such single-input, single output (SISO), multiple-input, multiple-output (MIMO), single-input, multiple-output (SIMO), etc. Each of these topologies has differing advantages and applications with respect to the wireless transmission environment for a radio link. Also, various transmitter and receiver techniques may be deployed, for example, signal carrier techniques such as BPSK, multiple carrier techniques such as a QPSK, etc.

For example, with respect to WLAN communications systems, data throughput of at least 100 Mbit/s is achievable using at least in part MIMO topologies in which the throughput rate is generally four-to-five times faster than under IEEE 802.11a or 802.11g, and perhaps twenty times faster than under IEEE 802.11b. MIMO communication techniques make use of multi-element antenna arrays at both the transmit and the receive side of a radio link. For further comparison, MIMO communication techniques also improve throughput capacity over single-input multiple-output (SIMO) systems. SIMO channels in wireless networks can provide diversity gain, array gain, and interference canceling gain among other benefits. In addition to these advantages, MIMO links can offer a multiplexing gain by opening $N_{min}$ parallel spatial channels, where $N_{min}$ is the minimum of the number of transmit and receive antennas.

With such improvements, legacy system interoperability with legacy frame formats is also needed while supporting these improved throughput technologies. Interoperability provides support for various frame formats while achieving the objectives of improved data transmission for a communications system. The legacy frame format 402 represents a format used in legacy-based communications systems. The frame formats 422 and 442 represent frame formats for use in communications systems having improved throughput.

Notably, receiver signal path circuitry such as that in FIG. 4 has no a priori knowledge about packet-arrival times, modulation, or encryption of the received encoded signal. Generally, it is unreasonable to assume that a receiver has prior knowledge of a time-varying channel, where in noncoherent communications, the receiver must estimate both the channel and the data. The random nature of the arrival times and the high data throughput require the synchronization to be completed shortly after the start of the reception of a frame, which is processed using observed characteristics or processed a posteriori.

Figure 8:
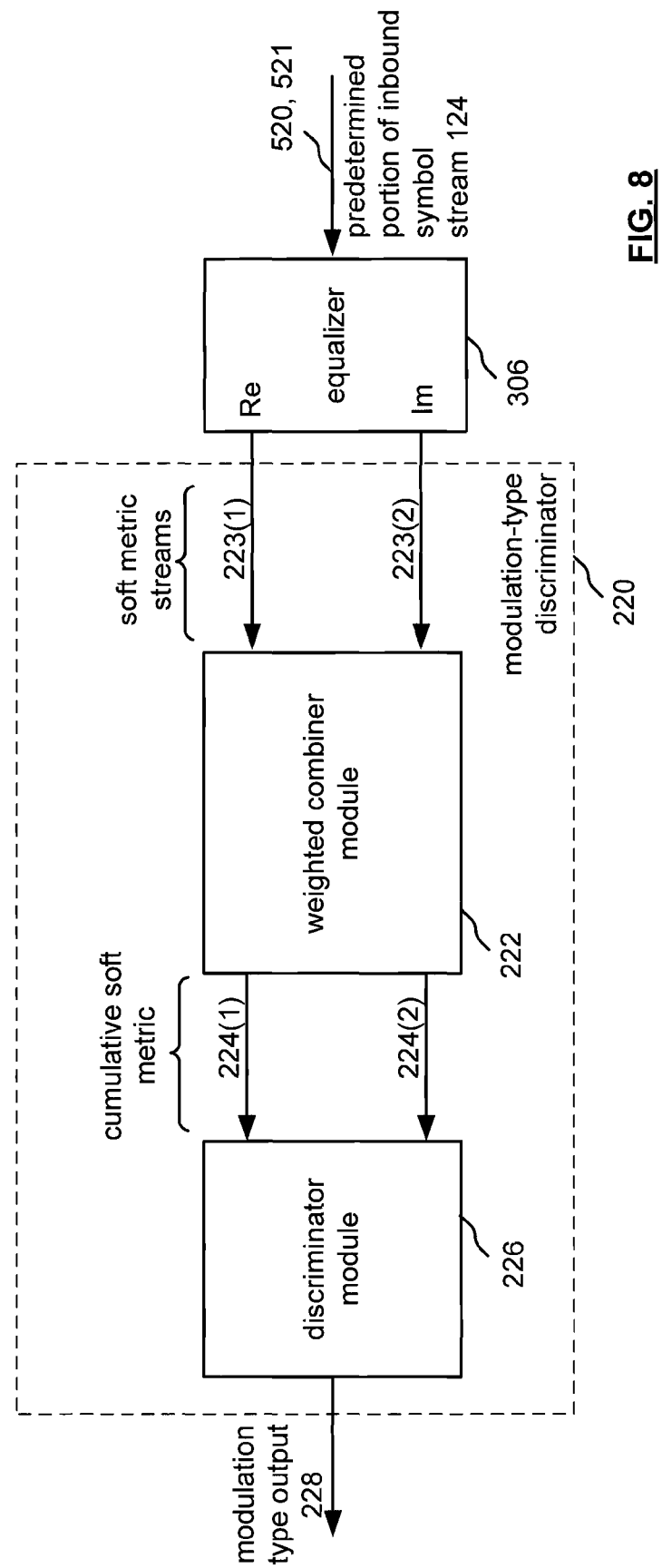
FIG. 8 is a block diagram of a modulation-type discriminator according to an embodiment of the invention.

FIG. 8 is a block diagram of a modulation-type discriminator 220 that includes a weighted combiner module 222, and a discriminator module 226. The modulation-type discriminator 220 is operable to receive a predetermined portion of an encoded signal 500 (see FIGS. 6 and 7). The predetermined portion of the inbound symbol stream 124 may be provided as a predetermined portion 520 and/or 521 of FIGS. 6 and 7. The encoded signal 500 has a preamble training sequence associated with a data packet. A predetermined portion of the encoded signal has a plurality of symbols x that are encoded in one of a plurality of modulation types.

The equalizer 306 transforms the symbols x of the predetermined portion of the received signal in such a way that the soft metrics that make up the soft-metric streams 223(1) and 223(2) used by the modulation-type discriminator 220 are represented by the real and imaginary parts of each of the equalized symbols x. That is, the streams are represented in a quadrature or complex form for quadrature processing. The weighted combiner module 222 receives the plurality of soft metric streams 223(1) and 223(2) and operates to cumulatively sum the soft metrics contained in each of the plurality of soft metric streams to produce cumulative soft metrics 224(1) and 224(2). The discriminator module 226 is operable to receive the cumulative soft metrics 224(1) and 224(2), and is further operable to compare the cumulative soft metrics 224(1) and 224(2) to provide a discriminated modulation type from the plurality of specified modulation types. The discriminated modulation type is provided to the modulation type output 228.

For the example provided, the specified modulation types represented in FIGS. 6 and 7 are BPSK, rotated BPSK, and QPSK. As should be readily appreciated by those skilled in the art, additional specified modulation types can be provided with respect to further development or classes with respect to the encoded signals 400.

The discrimination is made for robust modulation types that exhibit transmission tolerance in view of environmental factors (for example, signal interference, attenuation, etc.). Examples of robust modulation-types are QPSK, BPSK, and rotated-BPSK BPSK is a method of encoding and/or transmitting on top of a carrier. The basic principle behind BPSK is to provide a carrier whose phase is alternated between 0-degrees and 180-degrees, as needed, to convey digital information. Rotated BPSK provides a phase that is alternated between 90-degrees and 270 degrees. QPSK is a form of modulation in which a carrier sends data symbols using a four phase modulation scheme to reflect one of four different two-bit wide data signals (00, 01, 10 and 11). Those phases typically are 45, 135, 225, and 315 degrees. The change in phase from one symbol to the next encodes two bits per symbol. In QPSK, the four angles are usually out of phase by ninety degrees.

As an example, from the inbound symbol stream 124, there are N symbols in the predetermined portion (for example, predetermined portion 521 or the predetermined portion 520). Let $e_k$, where k is the symbol number, denote the equalized output of these N symbols. Then soft-metric stream 223(1) is made up of the real part of each equalized symbol $e_k$, Soft-metric stream 223(1)=Re($e_k$), where k=1, ..., N and soft-metric stream 223(2) is made up of the imaginary part of each equalized symbol $e_k$ Soft-metric stream 223(1)=Im($e_k$), where k=1, ..., N The cumulative values 224(1) and 224(2) are then formed by summing the absolute value of each component of soft-metric streams 223(1) and 223(2) respectively.

$$\text{Cumulative\_soft\_metric\_224(1)} = \sum_{k=1}^{N} |\text{Re}(e_k)|$$

$$\text{Cumulative\_soft\_metric\_224(2)} = \sum_{k=1}^{N} |\text{Im}(e_k)|$$

If the N symbols of the predetermined portion of the inbound symbol stream 124 are encoded using BPSK, then the cumulative soft metric 224(1) will be much larger than the cumulative soft metric 224(2). This may be represented as:

Cumulative_soft_metric_224(1)>Cumulative_soft_metric_224(2)

Accordingly, the a posteriori likelihood is that the modulation type output 228 is BPSK.

If the N symbols of the predetermined portion of the inbound symbol stream 124 are encoded using rotated-BPSK, then the cumulative soft metric 224(1) will be much smaller than the cumulative soft metric 224(2). This may be represented as:

Cumulative_soft_metric_224(1)<Cumulative_soft_metric_224(2)

Accordingly, the a posteriori likelihood is that the modulation type output 228 is rotated-BPSK.

If the N symbols of the predetermined portion 229 are encoded using QPSK, then the cumulative soft metric 224(1) is substantially equivalent to the cumulative soft metric 224(2).

This relationship may be represented as:

Cumulative_soft_metric_224(1)≈Cumulative_soft_metric_224(2)

Accordingly, the a posteriori likelihood is that the modulation type output 228 is QPSK.

FIG. 9 is a table illustrating the operation functional state of the modulation-type discriminator 220 of FIG. 8. As shown, the table 700 has three columns, a comparison results 225 column, a cumulative soft metric 224 column, and a modulation type 228 column.

The table is divided into a favorable column and an unfavorable column with respect to designation and modulation types 228. The arrangement of the table is informational in that it does not set out a mandated comparison sequence or order. For example, the magnitude differences shown in rows 704 and 706 are more readily discernible with respect to the magnitude of the difference shown in row 702. It follows then that if the conditions set out in rows 704 and 706 do not exist, then the logical result is a favorable comparison result of row 702. As should be readily appreciated by those skilled in the art, other comparison methodologies may be used for arriving at a modulation-type output decision. Two cumulative soft metrics 224(1) and 224(2) (see FIG. 7) are generated. With respect to row 702, a favorable result with respect to cumulative soft metrics is provided when the first cumulative soft metric 224(1) is substantially equivalent to the second cumulative soft metric 224(2). In other words, the modulation-type of the signal field from the received encoded signal correlates to a QPSK modulation type.

With respect to row 704, an unfavorable result exists when the first cumulative value 224(1) is greater than the second cumulative value 224(2) scaled by a tolerance β, which indicates a BPSK modulation type. As should be readily appreciated by those skilled in the art, a tolerance "β" may be provided to take into consideration variances, channel characteristics, and/or other factors influencing the received signal. For example, a large number of variants are introduced through the transmission environment, the a posteriori likelihood can be made greater by placing the tolerance β greater than "1."

In the third row designated as row 706, a further unfavorable determination is made where the first cumulative value 224(1) is less than the second cumulative value 224(2) scaled by a tolerance β. In this instance, the modulation type 228 for the predetermined portion is a rotated-BPSK. Again, for example, a large number of variants are introduced through the transmission environment, the a posteriori likelihood can be made greater by placing the tolerance "β" less than "1."

Figure 10:
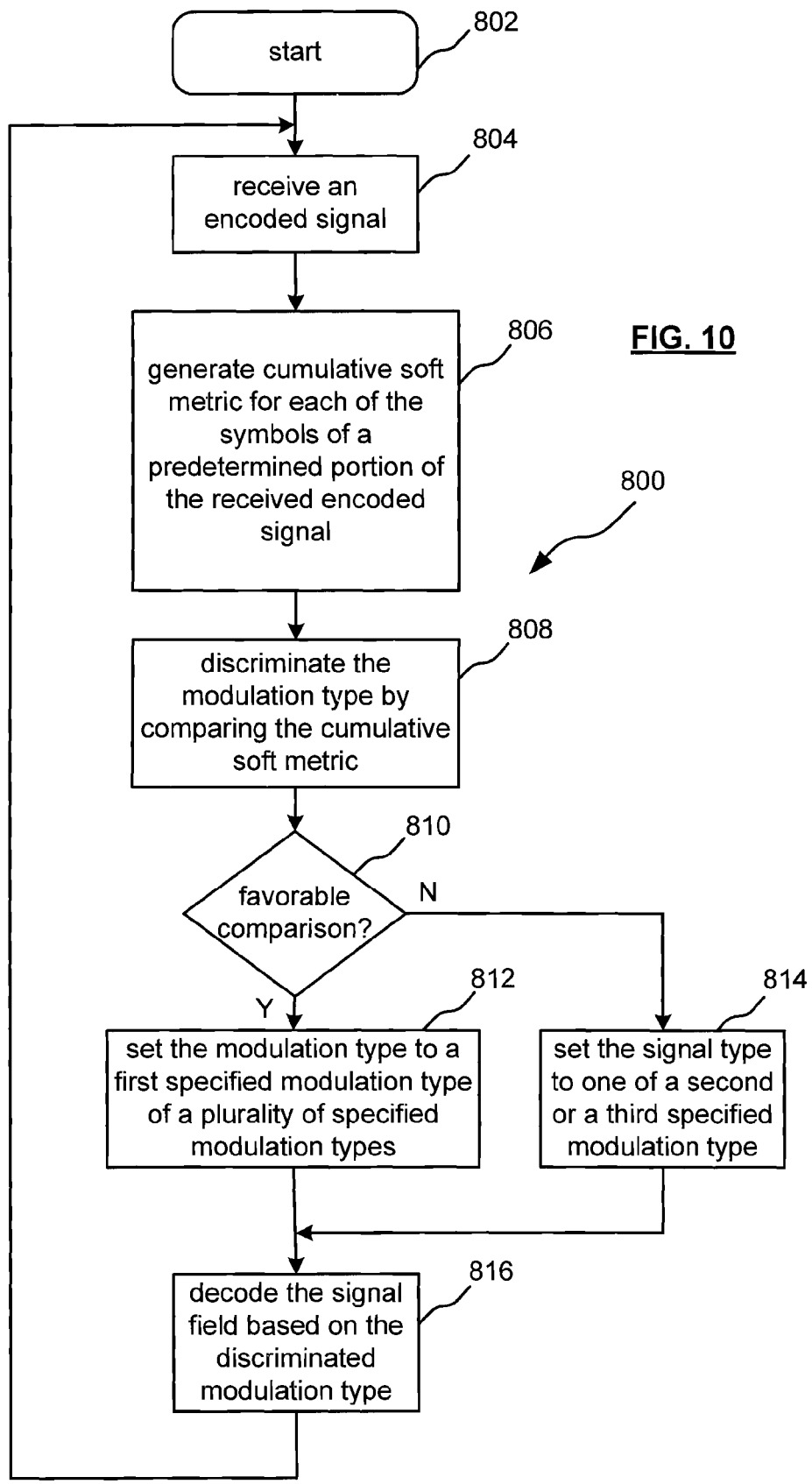
FIG. 10 is a logic diagram illustrating a method of discriminating a modulation type for a signal field according to an embodiment of the invention.

FIG. 10 is a logic diagram illustrating a method of discriminating a modulation type. Starting at step 802, the method 800 proceeds to step 804 where an encoded signal is received. At step 806, cumulative values are generated from soft metrics, which may be provided by an equalizer (see FIG. 8), through demapping, or other suitable form of soft metric generation. Proceeding to step 808, the modulation type is discriminated by comparing the cumulative values generated in step 806. At step 810, a determination is made of whether a favorable comparison is achieved. When a favorable comparison results, then in step 812 set the modulation type of the signal field for the encoded signal to a first specified modulation type of a plurality of specified modulation types. When an unfavorable comparison results, then in step 814, set the modulation type to one of a second or a third specified modulation type. Following steps 812 and 814, at step 816, the method conducts a decoding of the signal field based on the discriminated modulation type. As should be noted, the process continues with respect to each of the encoded signals 400 that may be received by the radio 60.

Figure 11:
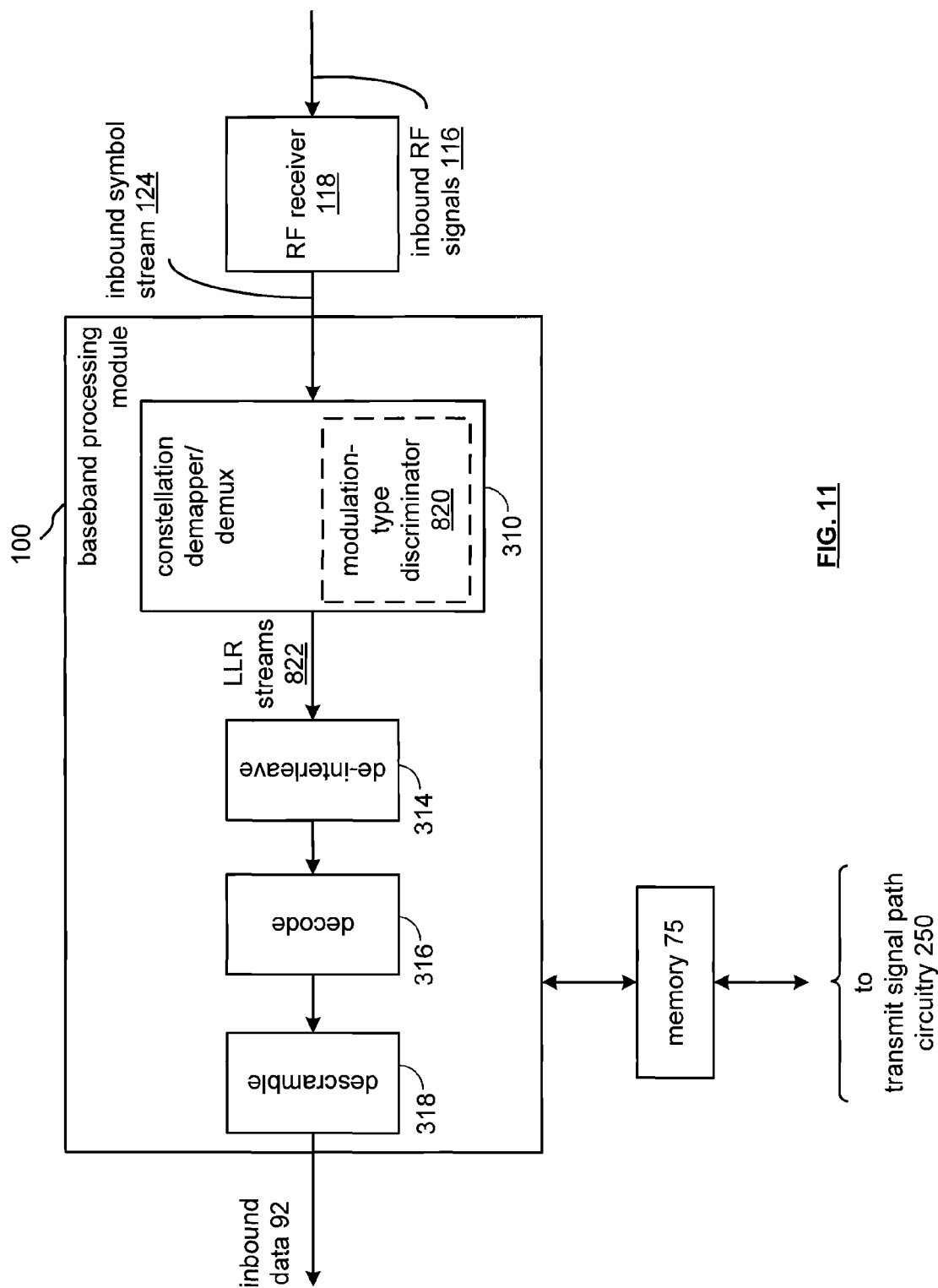
FIG. 11 is a simplified block diagram of the digital receiver module according to an embodiment of the invention.

FIG. 11 is a simplified block diagram of the digital receiver module 302. The digital receiver processing module 302 includes an equalizer 306, a demapper/demux 310, a de-interleave 314, a decode 316, and a descramble 318. The demapper/demux 310 includes functional components providing a modulation-type discriminator 820 to discriminate the modulation-type of received signals.

The baseband processing module 100 is coupled to receive an RF signal from the antenna 86, in which the RF signal was transmitted as an encoded signal having a predetermined portion that utilizes one or several of a plurality of modulation types, such as BPSK (Binary Phase Shift Keying), rotated BPSK, QPSK (Quaternary Phase Shift Keying), QAM (Quadrature Amplitude Modulation), et cetera.

The RF receiver 118 outputs an inbound symbol stream 124, which is provided to the constellation demapper/demux 310, which includes a modulation-type discriminator 820 to discriminate the modulation type of the inbound symbol stream 124. The constellation demapper/demux 310 produces log-likelihood ratio ("LLR") streams 822, which include a plurality of soft metrics (or soft decisions) that generally correlate to the received symbols. The modulation-type discriminator 820 is discussed in detail with respect to FIG. 12.

From the constellation demapper/demux 310, the de-interleave 314 receives and de-interleaves the LLR streams 822. Generally, an encoded signal will be interleaved by a transmitter per applicable standards specifications (such as IEEE 802.11). Interleaving avoids long runs of "zeros" and "ones.". The de-interleaved streams are decoded at decode 316, which may be provided as a Viterbi decoder, or other decoders as may be specified in the applicable standards specification. The decoded bits are then descrambled at descramble 318. The resulting data bits are output as inbound data 92.

In operation, the RF receiver 118 receives inbound RF signals 116 having a frame format that includes a preamble training sequence associated with a data packet. Generally, the configuration settings of the data packet such as length and modulation type are contained in a signal field, which may be considered a part of the preamble training sequence. Because the configuration settings are necessary for decoding the data packet, the signal field is encoded using a robust modulation type (for example, binary phase shift key, rotated binary phase shift keying, quaternary phase shift keying, et cetera).

Within a wireless communication environment, various frame formats exist for backwards compatibility purposes (and lower data-throughput characteristics), as well as those formats for higher data-throughput purposes. Accordingly, the modulation type of the signal field may differ among the various frame formats. Furthermore, the signal field portion of one frame format may coincide with the data portion of another frame format, such as the frame formats described in FIGS. 5 through 7.

The radio 60, having high-throughput data capability, receives these inbound RF signals 116, and without a priori knowledge of the underlying frame formats and modulation schemes, must discriminate the modulation-type of the pertinent portion before decoding the data portion for the received signal. The receiver uses the resulting discriminated modulation-type to decode the signal field contents, which the receiver uses to process and/or decode the associated data packet of the frame via the baseband processing module 100 (or the digital receiver processing module 302 of FIG. 2) to produce inbound data 92 to the host device 18-32.

The modulation-type discriminator 820 initially determines, or discriminates the modulation type for the signal field to allow for decoding of the encoded signal and the associated data. The signal field specifies the data configuration and length-related parameters for the data carried by the encoded signal. Generally, the baseband processor 100 performs the reverse operations of a transmitter with training overhead—for example, estimating a frequency offset and the symbol timing with respect to the received encoded signal. The training activity is conducted through use of a preamble training sequence.

FIG. 12 is a block diagram of a modulation-type discriminator 820 that includes an LLR (log-likelihood ratio) computation module 821, a summing module 824, and a discriminator module 828.

The LLR computation module 821 receives, via the equalizer 306, a predetermined portion 520 (see FIG. 6) or 521 (see FIG. 7) of the frame formats for the inbound symbol stream 124. The predetermined portion of the inbound symbol stream 124 includes a plurality of symbols x that are encoded in one a plurality of modulation types (such as BPSK, QPSK, et cetera).

The LLR computation module 821 generates a plurality of LLR streams 822 based upon generating an LLR value for each bit of the plurality of symbols x with respect to a modulation reference 836. The modulation reference 836 is an m-bit wide signal reference. For example, when the modulation reference 836 is a two-bit wide signal reference with m equal to two (such as with a QPSK reference), then the LLR computation module 821 produces two LLR streams 822. In this example, the specified modulation types, presented in FIGS. 6 and 7, are BPSK, rotated BPSK, and QPSK. As should be readily appreciated by those skilled in the art, additional specified modulation types can be provided with respect to further development or classes with respect to the frame formats for the inbound RF signals 116.

The summing module 824 receives the plurality of LLR streams 822(1) through 822(m) from the LLR computation module 821, and sums the plurality of LLR values of the respective LLR stream 822(1) through 822(m) to produce cumulative LLRs 826(1) through 826(m). The discriminator module 828 receives the cumulative LLRs 826(1) through 826(m) and compares the cumulative LLRs 826 to provide a modulation type output 830 from the plurality of specified modulation types.

In operation, the modulation-type discriminator 820 computes the log-likelihood ratio of each bit of the plurality of symbols x from the predetermined portion 520 (or 521) of the inbound symbol stream 124. Because each symbol is presumed to be m-bits wide, the LLR computation module 821 generates a plurality of LLR streams 822(1), 822(2), . . . , 822(m). In general, the LLR bit $b_i$ is provided by the a posteriori probability ratio (APPR), which can be represented by:

$$APPR_i = \log\frac{P(b_i = 1 \mid r)}{P(b_i = 0 \mid r)} \qquad [a]$$

$$= \log\frac{\sum_{\hat{s} \in S_i^-} P(\hat{s} \mid r)}{\sum_{\hat{s} \in S_i^-} P(\hat{s} \mid r)}$$

-continued $$APPR_i = LLR_i = \log \frac{\sum_{\hat{s} \in S_i^+} P(r|\hat{s})P(\hat{s})}{\sum_{\hat{s} \in S_i^-} P(r|\hat{s})P(\hat{s})} \quad [\text{a}]$$

where "r" is the received symbol and can be represented mathematically as r=hs+n, with h denoting the channel and n denoting the additive white Gaussian noise; Ŝ is the candidate transmit symbol with a bit mapping of $\{b_0, b_1, \ldots\}$, $S_i^+$ is the set of transmit symbols where $b_i=1$; and $S_i^-$ is the set of transmit symbols where $b_i=0$.

Generally, if the log ratio given by formula [a] is positive, then a higher confidence that the $i^{th}$ bit is a "1" than a "0." On the other hand, if the log ratio given by formula [d] is negative, then there is a higher confidence of the $i^{th}$ bit being a "0" than a "1." The more positive or negative the log ratio is, the higher the confidence of the corresponding estimate.

With no a priori knowledge, the $APPR_i$, the ratio of sums of probability, is:

$$APPR_i = LLR_i = \frac{\sum_{s \in S_i^+} P(r|\hat{s})}{\sum_{s \in S_i^-} P(r|\hat{s})} \quad [\text{b}]$$

where $p(r|\hat{s})$ is given by:

$$p(r|\hat{s}) = \frac{1}{\pi\sigma_n^2} e^{-\frac{1}{\sigma_n^2}|r-h\hat{s}|^2} \quad [\text{c}]$$

Using the nearest-neighbor approximation, $LLR_i$ becomes:

$$LLR_i \cong \frac{1}{\sigma_n^2}\left(\min_{\hat{s} \in S_i^-}|r - h\hat{s}|^2 - \min_{\hat{s} \in S_i^+}|r - h\hat{s}|^2\right) \quad [\text{d}]$$

which is expressed in terms of Euclidean distances between the received symbol r and the reconstructed candidate receive symbols hŝ. For receiver implementations that include an equalizer 306 (for example, see FIG. 8), the LLR computation module 821 receives equalized symbols, which can be appreciated as leading to conceptually simpler representation of $LLR_i$.

Let $\hat{q}=\hat{s}\sigma_q/\sigma_s$ be ŝ normalized to fall on an integer constellation grid, which will be discussed in detail with respect to FIGS. 13 through 16. Further, $$\langle |s|^2 \rangle = \sigma_s^2 \text{ and } \langle |\hat{q}|^2 \rangle = \sigma_Q^2 \quad [\text{e}]$$

Rewriting equation [d] using the normalized constellation provides:

$$LLR_i = \quad [\text{f}]$$

$$\frac{1}{\sigma_n^2}\min_{\hat{s} \in S_i^-}\left|h\frac{\sigma_S}{\sigma_Q}\left(\frac{1}{h}\frac{\sigma_Q}{\sigma_S}r - \frac{\sigma_Q}{\sigma_S}\hat{s}\right)\right|^2 - \frac{1}{\sigma_n^2}\min_{\hat{s} \in S_i^+}\left|h\frac{\sigma_S}{\sigma_Q}\left(\frac{1}{h}\frac{\sigma_Q}{\sigma_S}r - \frac{\sigma_Q}{\sigma_S}\hat{s}\right)\right|^2$$

Collecting the common terms, equation [f] can be simplified further to:

$$LLR_i = \frac{|h|^2}{\sigma_n^2}\frac{\sigma_S^2}{\sigma_Q^2}\left[\min_{\hat{q} \in Q_i^-}|(p - \hat{q})|^2 - \min_{\hat{q} \in Q_i^+}|(p - \hat{q})|^2\right] \quad [\text{g}]$$

where $$p = \frac{1}{h}\frac{\sigma_Q}{\sigma_S}r \text{ and } \hat{q} = \frac{\sigma_Q}{\sigma_S}\hat{s} \quad [\text{h}]$$

and $Q_i^-$ is the set of normalized transmit symbols (that is, integer-valued symbols) where $b_i=0$, and $Q_i^+$ is the set of normalized transmit symbols where $b_i=1$. Because the scaling term of $$\frac{|h|^2}{\sigma_n^2}\frac{\sigma_S^2}{\sigma_Q^2}$$

is common, the scaled and normalized LLR from an equalizer 306 (when present) equalizes the inbound symbol stream to the modulation type discriminator 820), in which the formula is of the form:

$$\Lambda_i \equiv \frac{LLR_i}{\frac{|h|^2}{\sigma_n^2}\frac{\sigma_S^2}{\sigma_Q^2}} = \min_{\hat{q} \in Q_i^-}|(p - \hat{q})|^2 - \min_{\hat{q} \in Q_i^-}|(p - \hat{q})|^2 \quad [\text{i}]$$

representing the nearest-neighbor squared Euclidean distances in an integer constellation. As should be readily appreciated by those skilled in the art, the LLR computation module 821 may provide various LLR metrics or methodologies, such as quantized version, and/or a scaled version and/or a limited version of the $LLR_i$ given in equation [d] and/or equation [i].

The modulation-type discrimination is made for robust modulation types having improved transmission tolerance in view of adverse environmental factors (for example, signal interference, attenuation, etc.). Examples of robust modulation-types are QPSK, BPSK, and rotated-BPSK. For the present invention, the modulation reference 836 is QPSK for discriminating with other robust modulation-types (e.g., BPSK, rotated-BPSK).

FIG. 13 is an illustration of the constellation of a modulation reference 836 plotted with respect to an in-phase axis (I) and a quadrature axis (Q). The modulation reference 836 provided is QPSK, which is a two-bit wide modulation and has a bit set equal to $\{b_1, b_0\}$ with four points a, b, c, and d. QPSK is a form of modulation in which a carrier sends data symbols using a four phase modulation scheme to reflect one of four different two-bit wide data signals (00, 01, 10 and 11). Those phases typically are 45, 135, 225, and 315 degrees. The change in phase from one symbol to the next encodes two bits per symbol. In QPSK, the four angles are usually out of phase by ninety degrees.

As shown, the four references a, b, c, and d have Cartesian coordinates of:

| Point | $b_0$ | $b_1$ | I-axis | Q-axis |
|-------|-------|-------|--------|--------|
| a | 1 | 1 | 1 | j |
| b | 1 | 0 | 1 | −j |
| c | 0 | 0 | −1 | −j |
| d | 0 | 1 | −1 | j |

With N symbols for each of the predetermined portions 520 or 521 the LLR computation module 821 computes an LLR for the bit 0 and bit 1 for each of the N symbols, using either formula [i] (when an equalizer 306 is present) or formula [d] when an equalizer is not present. The cumulative LLRs 826 (1) and 826(2) are then formed by summing the absolute value of LLR streams 822 for bit 0 and bit 1 of each of the N symbols respectively.

$$\text{Cumulative\_LLR\_224}(1) = \sum_n |LLR_{0,n}| \qquad [j]$$

and for bit $b_1$ can be represented as follows:

$$\text{Cumulative\_LLR\_224}(2) = \sum_n |LLR_{1,n}| \qquad [k]$$

Modulation type discrimination may be described with respect to the constellation of the modulation reference, such as that described in detail with reference to FIGS. 14 through 16. For simplicity, the wireless channel is assumed to be "flat" or that the receiver includes an equalizer 306. Accordingly, the modulation type may be discriminated by a comparison to the nearest neighbor in computing the LLRs as given in the formula [i].

FIG. 14 is an example of a BPSK discrimination 840 with respect to an in-phase axis I versus a quadrature axis Q. As shown, a predetermined portion symbol 606 of the received encoded signal is shown positioned in respect to the modulation reference 227 such that the symbol represent a BPSK modulation orientation.

Based on a QPSK reference, the LLR module 221, with the LLR computation 212, will generate two LLRs for the pre-determined-portion symbol 852, one for bit bo and the other for bit $b_1$. The LLRs are computed based on formula [i] where q̂ can be any of the modulation reference 836 points a, b, c, and d. A cumulative LLR 826 for the N symbols of predetermined portion 520 or 521, results in whether the cumulative LLR 826(1) is greater than the cumulative LLR 826(2), in that the likelihood for bit $b_0$ of the predetermined portion is large while the likelihood for bit $b_1$ of the predetermined portion is small. This may be represented as:

$$\text{Cumulative\_LLR\_224}(1) > \text{Cumulative\_LLR\_224}(2) \qquad [l]$$

or:

$$\sum_n |LLR_{0,n}| > \sum_n |LLR_{1,n}| \qquad [m]$$

Accordingly, the a posteriori likelihood is that the modulation type output 830 is BPSK, where basic principle is to provide a carrier with a phase that is alternated between 0-degrees and 180-degrees, as needed, to convey digital information.

FIG. 15 is an example of a rotated-BPSK discrimination 842 with respect to an in-phase axis I versus a quadrature axis Q. As shown, a predetermined-portion sub-symbol 854 is positioned with respect to the modulation reference 836 such that the symbol represents a rotated-BPSK modulation orientation.

The LLR computation module 821 generates two LLRs for the predetermined-portion sub-symbol 854, one for bit $b_0$ and the other for bit $b_1$. The LLRs are computed based on the formula [i] where q̂ can be any of the modulation reference 836 points a, b, c, and d. A cumulative LLR 826 for N symbols of the predetermined portion show that the cumulative LLR 826(1) is less than the cumulative LLR 826(2), in that the likelihood for bit $b_0$ of the predetermined portion 520 or 521 is small while the likelihood for bit $b_1$ of the predetermined portion 520 or 521 is large. This may be represented as:

$$\text{Cumulative\_LLR\_224}(1) < \text{Cumulative\_LLR\_224}(2) \qquad [n]$$

or:

$$\sum_n |LLR_{0,n}| < \sum_n |LLR_{1,n}| \qquad [o]$$

Accordingly, the a posteriori likelihood is that the modulation type output 830 is rotated-BPSK, where rotated BPSK provides a phase that is alternated between 90-degrees and 270 degrees, as needed, to convey digital information.

FIG. 16 is an example of a QPSK discrimination 844 with respect to an in-phase axis I versus a quadrature axis Q. As shown, the predetermined portion sub-symbol 856 of the received encoded signal is positioned with respect to the modulation reference 836 such that the N symbols of the predetermined portion 520 or 521 represent a QPSK modulation orientation.

With a QPSK modulation reference 836, the LLR computation module 821 generates two LLRs for the predetermined-portion symbol 856, one for bit $b_0$ and the other for bit $b_1$. The LLRs are computed based on formula [i] where q̂ can be any of the modulation reference 836 points a, b, c, and d. A cumulative LLR 826 for the N symbols of the predetermined portion 520 or 521 show the cumulative LLR 826(1) being substantially equivalent to the cumulative LLR 826(2). This may be represented as:

$$\text{Cumulative\_LLR\_224}(1) \approx \text{Cumulative\_LLR\_224}(2) \qquad [p]$$

or $$\sum_n |LLR_{0,n}| \approx \sum_n |LLR_{1,n}| \qquad [q]$$

Accordingly, the a posteriori likelihood is that the modulation type output 830 is QPSK.

FIG. 17 is a result table illustrating the operation functional state of the modulation-type discriminator 820 of FIG. 12. The result table 850 includes three columns, a comparison results column 858, a cumulative LLR column 860, and a modulation type column 862.

The table 850 is arranged for informational use in that it does not set out a mandated comparison sequence or order. For example, the magnitude differences shown in rows 854 and 856 are more readily discernible with respect to the magnitude of the comparison difference of row 852. It follows then that if the conditions set out in rows 854 and 856 are not present, then the logical result is a favorable comparison result of row 852. As should be readily appreciated by those skilled in the art, other comparison methodologies may be used for arriving at a modulation-type output decision. Also, for the example provided in FIG. 17, the modulation reference 836 is a QPSK signal reference such as that illustrated in FIG. 13.

Accordingly, the cumulative LLRs 826(1) and 826(2) that the summing module 824 outputs to the discriminator module 828, are discriminated to produce a modulation type output 830. With respect to row 852, a favorable result with respect to cumulative LLRs is provided when the first cumulative LLR 826(1) is substantially equivalent to the second cumulative LLR 826(2). In other words, the modulation-type of the signal field from the received encoded signal correlates to the modulation reference 836.

With respect to row 854, an unfavorable result exists when the first cumulative LLR 826(1) is greater than the second cumulative LLR 826(2), scaled by a tolerance β, which indicates a BPSK modulation type. The tolerance β accounts for signal variances from channel characteristics, receiver characteristics, et cetera. For example, a large number of variants are introduced through the transmission environment, the a posteriori likelihood can be made greater by placing the tolerance β greater than "1."

In the third row 856, a further unfavorable determination results when first cumulative LLR 826(1) is less than the second cumulative LLR 826(2) scaled by a tolerance β. In this instance, the modulation type 830 for the predetermined portion is a rotated-BPSK. Again, for example, a large number of variants are introduced through the transmission environment, the a posteriori likelihood can be made greater by placing the tolerance β less than "1."

Figure 18:
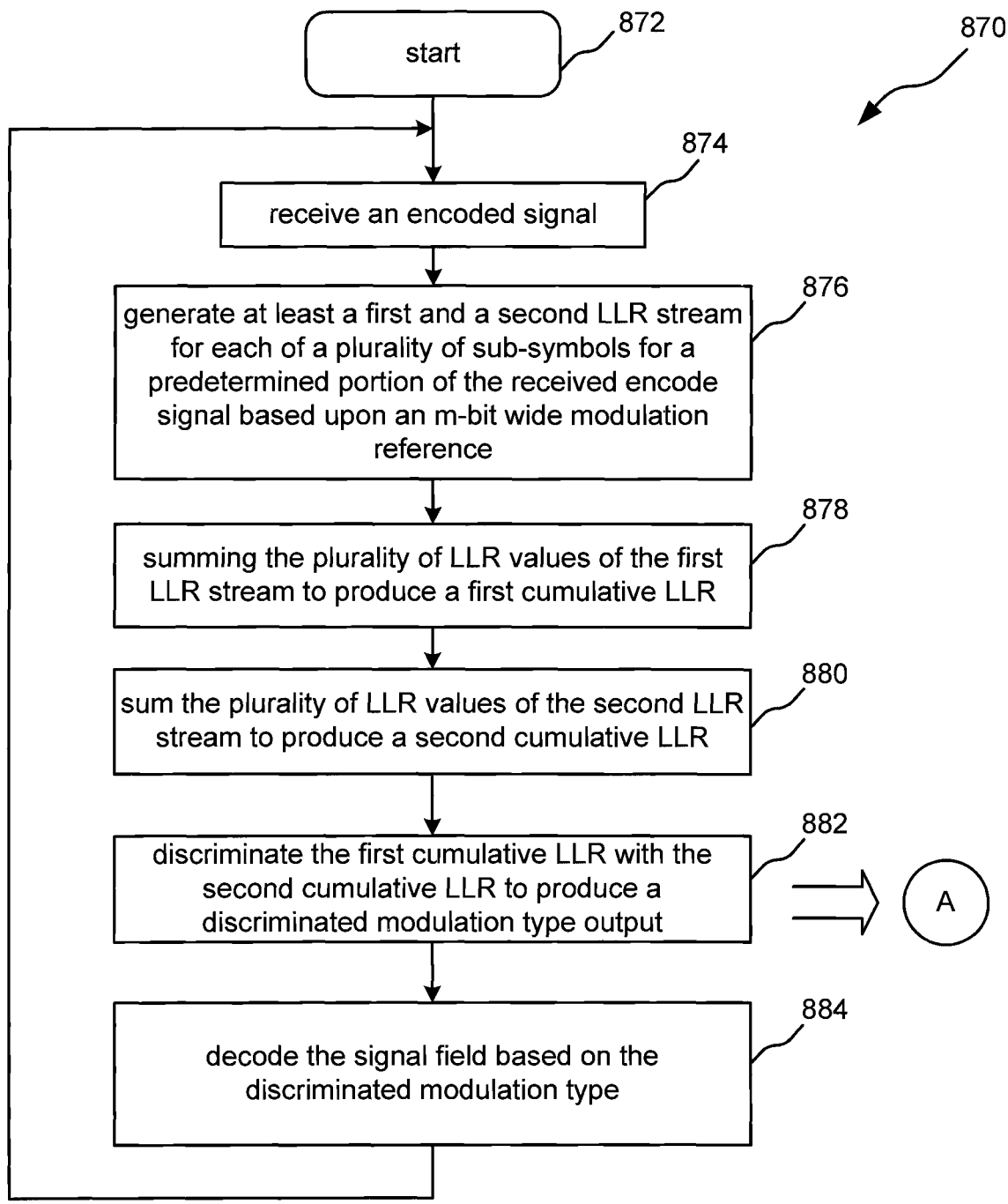
FIG. 18 is a logic diagram illustrating a method of discriminating a modulation type according to an embodiment of the invention.

FIG. 18 is a logic diagram illustrating a method 870 of discriminating a modulation type for decoding a signal field of an encoded signal in a wireless communication system. Starting at step 872, the method 870 proceeds to step 874 where a radio frequency receiver receives an encoded signal. At step 876, the radio generates at least a first LLR stream and a second LLR stream for each of a plurality of sub-symbols for a predetermined portion of the received encoded signal. The LLR streams are based upon an m-bit wide modulation reference, where m represents the bit width of the modulation reference. Accordingly, the first LLR stream and the second LLR stream includes a plurality of LLR values. At step 878, the plurality of LLR values of the first LLR stream are summed to produce a first cumulative LLR, and at step 880 the plurality of LLR values of the second LLR stream are summed to produce a second cumulative LLR. The radio discriminates the first cumulative LLR with the second cumulative LLR to produce a discriminated modulation type output at step 882. At step 884, the radio decodes the signal field based on the discriminated modulation type output. With the capability to discriminate modulation types at a radio receiver via the method 870, a received encoded signal may have one of many frame types in which a transmitter may apply different modulation types based upon wireless channel conditions within a wireless communications network.

Figure 19:
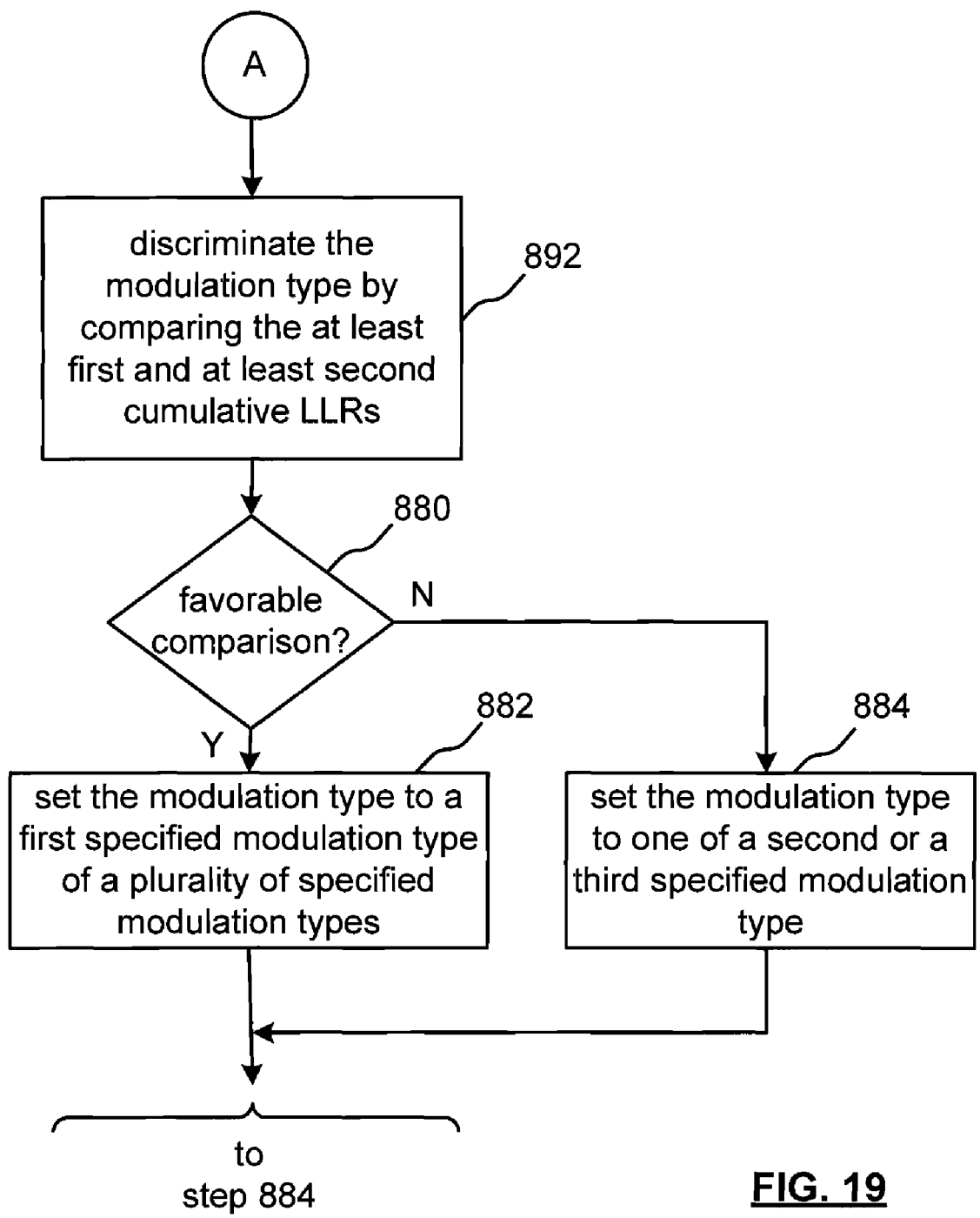
FIG. 19 is a logic diagram further illustrating to discriminating the modulation-type with the cumulative LLRs of FIG. 18.

FIG. 19 is a logic diagram illustrating a method 882 to discriminate the cumulative LLRs of FIG. 18. At step 892, the radio receiver discriminates the modulation type by comparing the at least first and second cumulative LLR. At step 880, upon a favorable comparison of the first cumulative LLR with the second cumulative LLR, the discriminated modulation type is set to a first specified modulation type of a plurality of specified modulation types at step 882. At step 880, upon an unfavorable comparison of the first cumulative LLR with the second cumulative LLR, the discriminated modulation type is set to one of a second or a third specified modulation type at step 884. With the modulation type set, the method continues to step 884 of FIG. 18.

A radio receiver may further discriminate the modulation type of the received encoded signal of step 874 by the difference between the modulation types of the first cumulative LLR and the second cumulative LLR. That is, when the first cumulative LLR is greater than the second cumulative LLR, the discriminated modulation type may be set to the second specified modulation type. On the other hand, when the first cumulative LLR is less than the second cumulative LLR, the discriminated modulation type may be set to the third specified modulation type. Accordingly, in the present example, the radio receiver may discriminate a modulation type of QPSK, BPSK, and rotated-BPSK modulations.

Another embodiment provides for discriminating the signal modulation-type based upon a conjugation of the wireless channel. The embodiment bases the discrimination upon a predetermined portion 520 and 521 (see, for example, FIGS. 6 and 7) by processing a predetermined portion of the inbound symbol stream 124, such as a preamble training sequence associated with a frame, through the nature or potential characteristics of the inbound symbols. The received symbol stream is represented as:

$$[r]r_n = h_n s_n + z_n$$

where r is the received symbol, h is the channel, s is the transmitted symbol, z is the additive white Gaussian noise and the index n denotes the $n^{th}$ symbol of the predetermined portion. Multiplying $r_n$ with the conjugate of the wireless channel $h_n$ (in which the ideal channel estimation is used for simplicity) gives:

$$[s]V_n = \text{Conj}(h_n)r_n = |h_n|^2 s_n + \text{conj}(h_n) z_n$$

where $V_n$ is a complex symbol. A receiver processes the magnitudes of the real and imaginary portions of $V_n$ from an inbound symbol stream 124 to produce a discriminated modulation type output. The discriminated modulation type output indicates modulation types for the signal field such as BPSK-encoded, rotated BPSK-encoded, or QPSK-encoded.

For example, when the transmitted symbol $s_n$ is BPSK-encoded, and when the signal-to-noise ratio (SNR) for the wireless channel is sufficiently large to minimize distortion of the corresponding constellation coordinate for the transmitted symbol, then the absolute value, or magnitude, of the real portion of conjugate $V_n$ is much greater than the absolute value, or magnitude, of the portion of the conjugate $V_n$. When the transmitted symbol $s_n$ is rotated BPSK-encoded, and when the signal-to-noise ratio (SNR) for the wireless channel is sufficiently large, then the absolute of the real portion of conjugate $V_n$ is much smaller than the absolute of the imaginary portion of the conjugate $V_n$. If the transmitted symbol $s_n$ is QPSK-encoded, then the absolute of the real part of $V_n$ is approximate to the absolute of the imaginary portion of $V_n$.

In yet another embodiment, the discriminator module 828 performs a tri-state discrimination function based upon the wireless channel conjugate $V_n$ to produce a modulation type output 830. The tri-state results include the possible values of {−1, 0, 1} based upon a predetermined portion 520 (or 521) of the inbound symbol stream 124. The tri-state operation is presented as follows:

$$\rho = \frac{1}{\sum_{n=1}^{N} |h_n|^2} \sum_{n=1}^{N} [|\text{Re}(V_n)| - |\text{Im}(V_n)|]\quad [t]$$

Accordingly, when ρ approximates "1," then the transmitted symbol $s_n$ is BPSK-encoded. When ρ approximates "−1," then the transmitted symbol $s_n$ is rotated BPSK-encoded. And when ρ approximates "0," then the transmitted symbol $s_n$ is QPSK-encoded.

Figure 20:
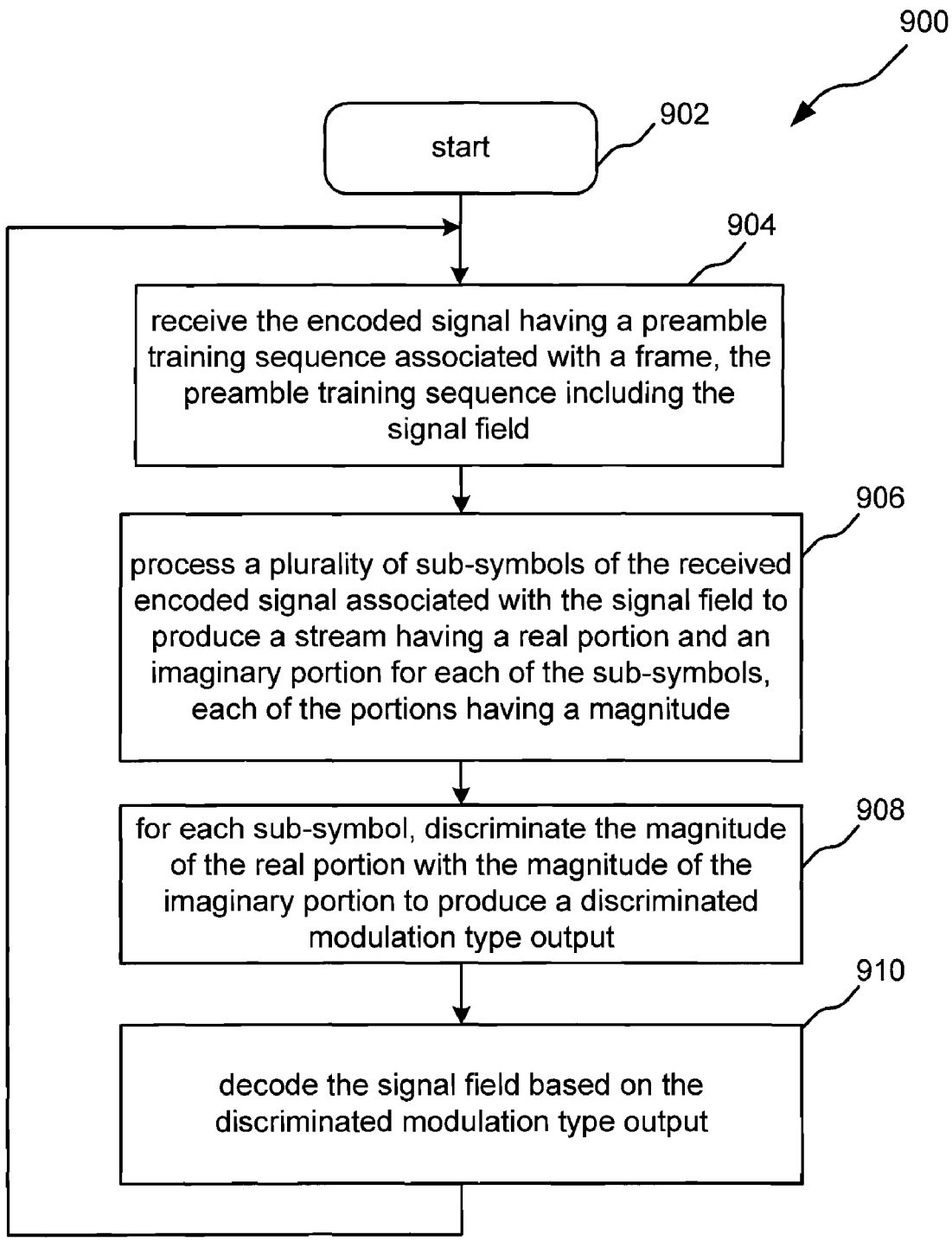
FIG. 20 is a logic diagram illustrating a yet another method for decoding a signal field of an encoded signal in a wireless communication system according to an embodiment of the invention.

FIG. 20 is a logic diagram illustrating a method 900 for decoding a signal field of an encoded signal in a wireless communication system. The decoding is based upon discriminating the signal modulation-type based upon a conjugation of the wireless channel.

Starting at step 902, a receiver receives an encoded signal having a preamble training sequence associated with a frame, the preamble training sequence including the signal field. At step 903, the receiver processes a plurality of sub-symbols of the received encoded signal associated with the signal field to produce a stream having a real portion and an imaginary portion for each of the sub-symbols, each of the portions having a magnitude.

The receiver may process the plurality of sub-symbols by multiplying the received encoded signal with the conjugate of the wireless channel (in which the ideal channel estimation is used for simplicity). The result has real and imaginary portions, in which at step 908, for each sub-symbol, the receiver discriminates the magnitude of the real portion with the magnitude of the imaginary portion of the inbound symbol stream 124 to produce a discriminated modulation type output, such as BPSK-encoded, rotated BPSK-encoded, or QPSK-encoded. At step 910, the receiver decodes the signal field based upon the discriminated modulation type output. The process continues with subsequent frames by returning to step 904.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A method of discriminating a modulation type for decoding a signal field of an encoded signal in a wireless communication system, the method comprises:
   receiving, via a receiver, the encoded signal having a preamble training sequence associated with a frame, the preamble training sequence including the signal field;
   generating at least a first log-likelihood ratio (LLR) stream and a second LLR stream for each of a plurality of sub-symbols for a predetermined portion of the received encoded signal based upon an m-bit wide modulation reference, wherein m represents the bit width of the modulation reference, the first LLR stream and the second LLR stream includes a plurality of LLR values;
   summing the plurality of LLR values of the first LLR stream to produce a first cumulative LLR;
   summing the plurality of LLR values of the second LLR stream to produce a second cumulative LLR;
   discriminating the first cumulative LLR with the second cumulative LLR to produce a discriminated modulation type output by:
      comparing the first cumulative LLR with the second cumulative LLR;
      upon a favorable comparison of the first cumulative LLR with the second cumulative LLR, setting the discriminated modulation type to a first specified modulation type of a plurality of specified modulation types; and
      upon an unfavorable comparison of the first cumulative LLR with the second cumulative LLR, setting the modulation type to one of a second or a third specified modulation type by:
         when the first cumulative LLR is greater than the second cumulative LLR, setting the discriminated modulation type to the second specified modulation type; and
         when the first cumulative LLR is less than the second cumulative LLR, setting the discriminated modulation type to the third specified modulation type; and
   decoding the signal field of the preamble training sequence based on the discriminated modulation type output.

2. The method of claim 1 wherein the third specified modulation type is a rotated second specified modulation type.

3. The method of claim 1 wherein the modulation reference is a QPSK modulation type.

4. The method of claim 1 wherein the second specified modulation type is a BPSK modulation type.

5. The method of claim 1 wherein the third specified modulation type is a rotated BPSK modulation type.

6. The method of claim 1 wherein the predetermined portion is a signal field.

7. The method claim 1 wherein the generating step further comprises:
   selecting the predetermined portion based on a format from a plurality of formats of the frame.

8. A modulation-type discriminator for a radio frequency receiver comprises:
   a log-likelihood ratio (LLR) module operable to receive a signal field of an encoded signal having a preamble training sequence associated with a frame, the LLR module operable to generate a first and a second LLR stream for each of a plurality of sub-symbols for a predetermined portion of the received encoded signal based on a two-bit wide modulation reference;

a summing module disposed to receive the first and the second LLR streams and operable to cumulate the first LLR stream to produce a first cumulative LLR and the second LLR stream to produce a second cumulative LLR; and a discriminator module operable to receive the first and the second cumulative LLR, and further operable to compare each of the first and the second cumulative LLR to provide a discriminated modulation type from a plurality of specified modulation types by:

comparing the first cumulative LLR with the second cumulative LLR;

upon a favorable comparison result that discriminates the received signal field as substantially equivalent to the modulation reference, setting the discriminated modulation type to a first specified modulation type of the plurality of specified modulation types; and upon an unfavorable comparison result that discriminates the received signal field as being non-equivalent to the modulation reference, setting the discriminated modulation type to one of a second or a third specified modulation type of the plurality of specified modulation types by:

when the first cumulative LLR is greater than the second cumulative LLR, setting the discriminated modulation type to the second specified modulation type; and when the first cumulative LLR is less than the second cumulative LLR, setting the discriminated modulation type to the third specified modulation type.

9. The modulation-type discriminator of claim 8 wherein the modulation reference is a QPSK modulation type.

10. The modulation-type discriminator of claim 8 wherein the first specified modulation type of the plurality of specified modulation types is a QPSK modulation type.

11. The modulation-type discriminator of claim 8 wherein the second specified modulation type of the plurality of specified modulation types is a BPSK modulation type.

12. The modulation-type discriminator of claim 8 wherein the third specified modulation type of the plurality of specified modulation types is a rotated-BPSK modulation type.

13. The modulation-type discriminator of claim 8 wherein the predetermined portion is a signal field.

14. The modulation-type discriminator of claim 8 wherein the predetermined portion is based on a format from a plurality of formats for the frame.

15. An integrated circuit radio transceiver comprises:

transmit signal path circuitry operable to transmit radio-frequency signals;

receive signal path circuitry operable to receive radio-frequency signals having a preamble associated with a frame, the preamble having a signal field, the receive signal path circuitry includes modulation-type discriminator circuitry coupled to discriminate a signal field modulation type from a predetermined portion of a received radio-frequency signal, the modulation-type discriminator circuitry includes logic circuitry that comprises:

a digital receiver processing module; and memory coupled to the digital receiver processing module, wherein the memory stores operational instructions that prompts the digital receiver processing module to:

generate at least a first log-likelihood ratio (LLR) stream and a second LLR stream for each of a plurality of sub-symbols for a predetermined portion of the received encoded signal based upon an m-bit wide modulation reference, wherein m represents the bit width of the modulation reference, the first LLR stream and the second LLR stream includes a plurality of LLR values;

sum the plurality of LLR values of the first LLR stream to produce a first cumulative LLR;

sum the plurality of LLR values of the second LLR stream to produce a second cumulative LLR;

discriminate the first cumulative LLR with the second cumulative LLR to produce a discriminated modulation type output by:

upon a favorable comparison result that discriminates the signal field of the received radio-frequency signal as substantially equivalent to a two-bit wide modulation reference, setting the discriminated modulation type to a first specified modulation type of a plurality of specified modulation types; and upon an unfavorable comparison result that discriminates the signal field of the received radio-frequency signal as being non-equivalent to the two-bit wide modulation reference, setting the discriminated modulation type to one of a second or a third specified modulation type of the plurality of specified modulation types by:

when the first cumulative log likelihood ratio is greater than the second cumulative log likelihood ratio, setting the discriminated modulation type to the second specified modulation type; and when the first cumulative log likelihood ratio is less than the second cumulative log likelihood ratio, setting the discriminated modulation type to the third specified modulation type; and decode the signal field based upon the discriminated modulation type output.

16. The integrated circuit radio transceiver of claim 15 wherein the modulation reference is a QPSK modulation type.

17. The integrated circuit radio transceiver of claim 15 wherein the first specified modulation type of the plurality of specified modulation types is a QPSK modulation type.

18. The integrated circuit radio transceiver of claim 15 wherein the second specified modulation type of the plurality of specified modulation types is a BPSK modulation type.

19. The modulation-type discriminator of claim 15 wherein the predetermined portion is a signal field.

20. A method of discriminating a modulation type for decoding a signal field of an encoded signal in a wireless communication system, the method comprises:

receiving, via a receiver, the encoded signal having a preamble training sequence associated with a frame, the preamble training sequence including the signal field;

processing a plurality of sub-symbols of the received encoded signal associated with the signal field to produce a stream having a real portion and an imaginary portion for each of the sub-symbols, each of the portions having a magnitude;

for each sub-symbol, discriminating the magnitude of the real portion with the magnitude of the imaginary portion to produce a discriminated modulation type output, wherein:

when the magnitude of the real portion and the imaginary portion approximate each other, the discriminated modulation type output is a first modulation type;

when the magnitude of the real portion and the imaginary portion are not approximate to each other, the discriminated modulation type output is one of a second or a third modulation type, such that:

when the magnitude of the real portion is greater than that of the imaginary portion, the discriminated modulation type output is the second specified modulation type; and when the magnitude of the real portion is less than that of the imaginary portion, the discriminated modulation type output is the third specified modulation type; and decoding the signal field of the preamble training sequence based on the discriminated modulation type output.

21. The method of claim 20 wherein processing the plurality of sub-symbols further comprises:

multiplying the received encoded signal with the conjugate of a channel estimate.

22. The method of claim 20 wherein the first modulation type is a QPSK modulation type.

23. The method of claim 22 wherein the second modulation type is a BPSK modulation type.

24. The method of claim 23 wherein the third specified modulation type is a rotated BPSK modulation type.

* * * * *